(12) United States Patent
Henk

(10) Patent No.: US 7,152,746 B2
(45) Date of Patent: Dec. 26, 2006

(54) MEDIA HOLDING DEVICE

(75) Inventor: Keith L. Henk, Eagan, MN (US)

(73) Assignee: New Product Guys, Inc., Eagan, MN (US)

( * ) Notice: Subject to any disclaimer, the term of this patent is extended or adjusted under 35 U.S.C. 154(b) by 3 days.

(21) Appl. No.: 10/628,669

(22) Filed: Jul. 28, 2003

(65) Prior Publication Data

US 2005/0023232 A1     Feb. 3, 2005

(51) Int. Cl.
*A47B 65/00*     (2006.01)

(52) U.S. Cl. .......................... 211/43; 211/175; 211/182

(58) Field of Classification Search ................. 211/42, 211/43, 175, 40, 181.1, 182; 248/448, 441.1
See application file for complete search history.

(56) References Cited

U.S. PATENT DOCUMENTS

| | | | | | |
|---|---|---|---|---|---|
| 799,371 | A | * | 9/1905 | Eustis | ............................. 4/579 |
| 934,148 | A | * | 9/1909 | Duff | ............................. 211/43 |
| 1,006,328 | A | * | 10/1911 | Widenhofer | ................ 211/195 |
| 2,061,937 | A | * | 11/1936 | Fay | ............................ 211/49.1 |
| 2,545,844 | A | * | 3/1951 | Cougias | ........................ 211/43 |
| 2,726,318 | A | * | 12/1955 | Marschke | ..................... 362/134 |
| 2,885,090 | A | * | 5/1959 | Forman et al. | .............. 211/175 |
| 3,171,542 | A | * | 3/1965 | Jacobs et al. | ................... 211/43 |
| 3,693,808 | A | * | 9/1972 | Rauch | ......................... 211/195 |
| 3,800,958 | A | * | 4/1974 | Dorn | ............................ 211/43 |
| 3,888,353 | A | * | 6/1975 | Leifheit | ........................ 211/37 |
| 4,099,624 | A | | 7/1978 | McKearin | |
| 4,113,108 | A | | 9/1978 | Anderson | |
| 4,463,854 | A | | 8/1984 | MacKenzie | |
| 4,637,632 | A | | 1/1987 | Rubash et al. | |
| 4,651,967 | A | * | 3/1987 | McCoy | ........................ 248/676 |
| 4,765,491 | A | * | 8/1988 | Mueller | ....................... 211/49.1 |
| 4,782,960 | A | | 11/1988 | Mavrakis | |
| 4,874,099 | A | * | 10/1989 | Arnott et al. | .................. 211/50 |
| 4,887,725 | A | | 12/1989 | VanNoord | |
| 5,072,835 | A | | 12/1991 | Price, Jr. et al. | |
| 5,103,987 | A | | 4/1992 | Davis | |
| 5,111,940 | A | | 5/1992 | VanNoord | |
| 5,183,163 | A | | 2/1993 | Slaiken | |
| 5,205,420 | A | | 4/1993 | Petryszak | |
| 5,228,578 | A | * | 7/1993 | Wu | ............................... 211/43 |
| 5,366,099 | A | | 11/1994 | Schmid | |
| 5,415,297 | A | | 5/1995 | Klein et al. | |
| 5,555,990 | A | | 9/1996 | Bechstein | |
| 5,762,208 | A | | 6/1998 | Yeh | |
| 5,775,522 | A | | 7/1998 | Martin, Sr. | |
| 5,860,535 | A | * | 1/1999 | Brown | ......................... 211/42 |
| 5,865,517 | A | * | 2/1999 | Wang | .......................... 312/237 |
| 5,992,647 | A | * | 11/1999 | Malik | .......................... 211/34 |
| 6,142,317 | A | | 11/2000 | Merl | |
| 6,334,540 | B1 | | 1/2002 | Plutsky | |
| 6,354,446 | B1 | | 3/2002 | Chang | |
| 6,439,528 | B1 | * | 8/2002 | Goto et al. | ............. 248/346.01 |
| 6,457,594 | B1 | * | 10/2002 | Tiemann | ................... 211/181.1 |
| 6,460,710 | B1 | | 10/2002 | Dardashti | |
| 6,648,150 | B1 | * | 11/2003 | Hartstone | ..................... 211/40 |
| 2001/0047972 | A1 | | 12/2001 | Plutsky | |

\* cited by examiner

*Primary Examiner*—Jennifer E. Novosad
(74) *Attorney, Agent, or Firm*—Kinney & Lange, P.A.

(57) ABSTRACT

A media holding device for supporting media in an upright position comprising a vertical element and a horizontal extension element, created from a continuous length of rod stock formed into segments. The vertical element is a vertical plane defined by at least three corner points creating a geometric shape, for providing lateral support for the held media. The horizontal extension element extends from the vertical element perpendicularly to the vertical plane, creating a horizontal plane for supporting the vertical element.

48 Claims, 14 Drawing Sheets

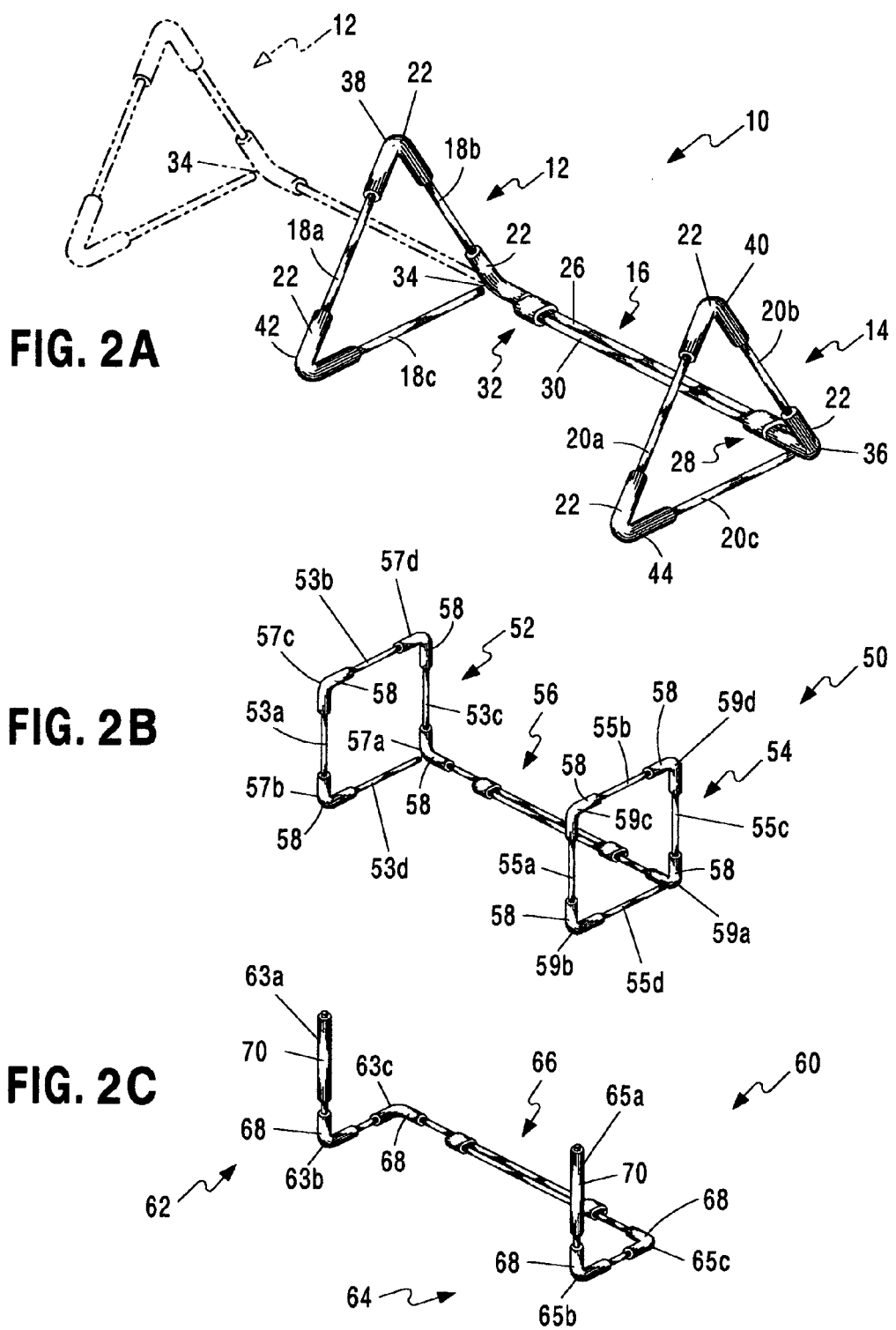

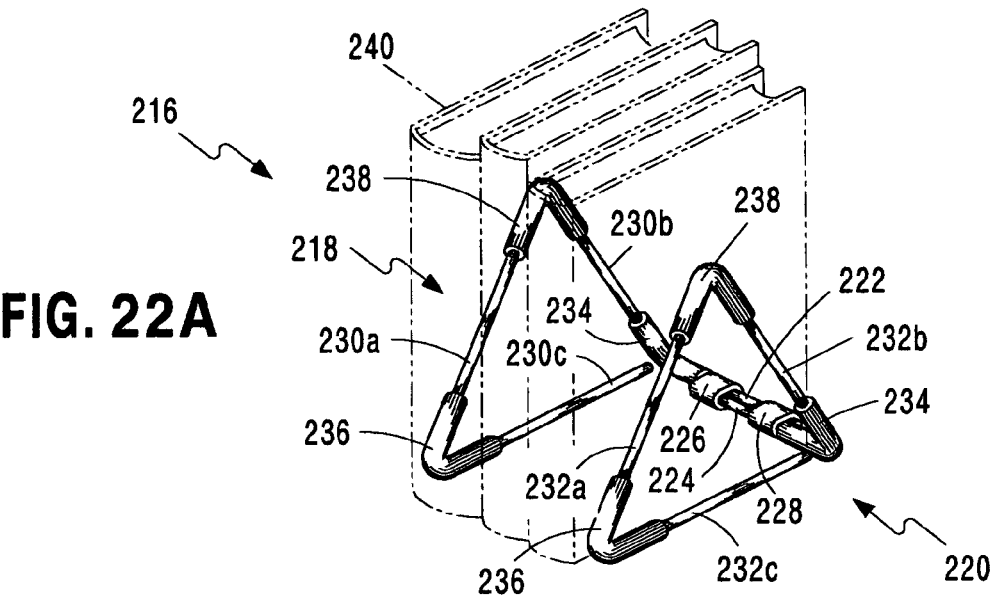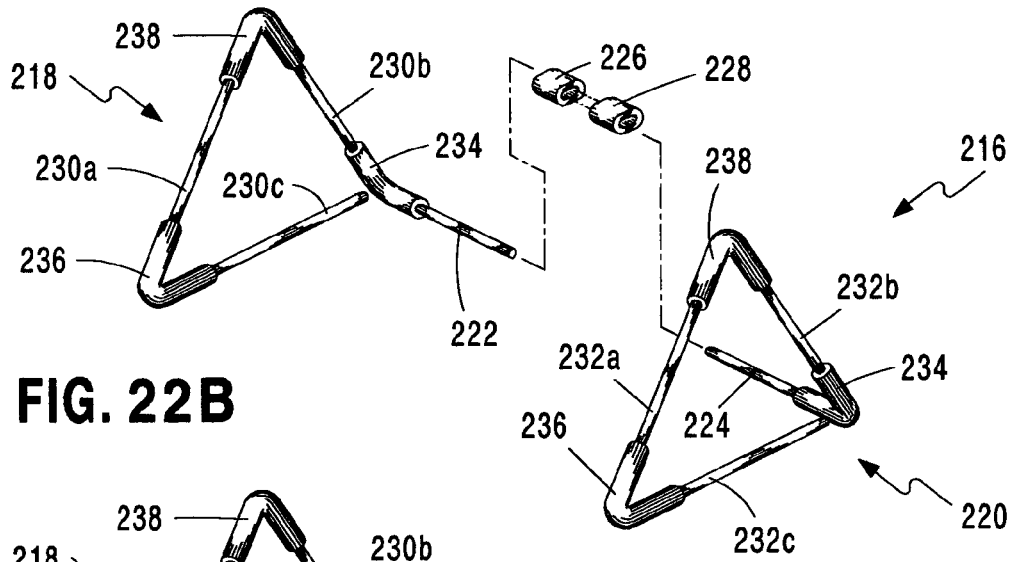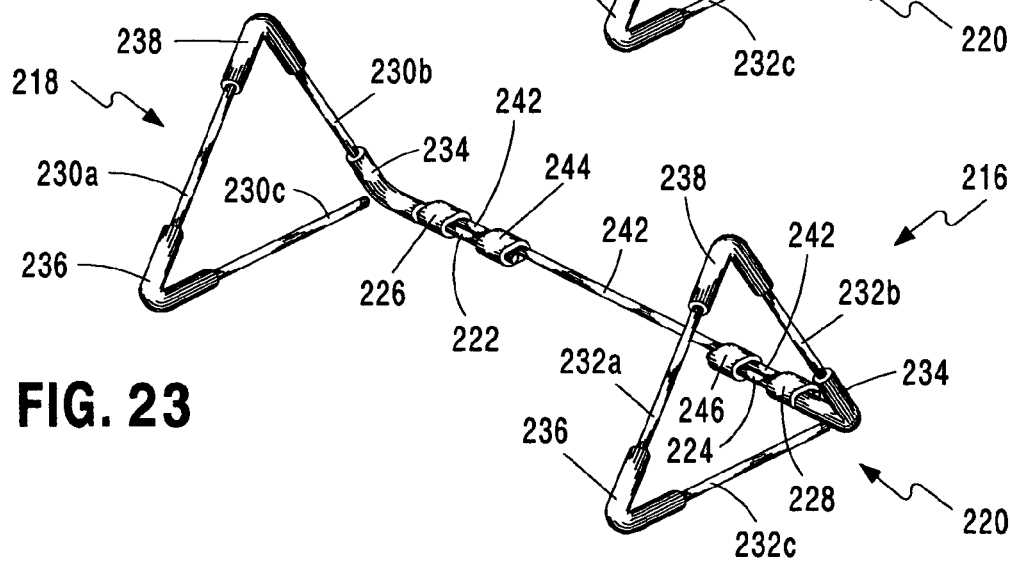

MEDIA HOLDING DEVICE

CROSS-REFERENCE TO RELATED APPLICATION(S)

None.

BACKGROUND OF THE INVENTION

The present invention relates to a media holding device for displaying media. In particular, the present invention relates to an effective and efficient media rack that is adjustable and modular by incorporating different horizontal support components.

Various types of media racks for displaying media such as books have been around for many years. Additionally, such racks have also found service as displays for media such as video cassettes, compact discs (CD), and digital versatile discs (DVD). Such media racks come in many different styles and designs.

A common style found in both the home and office is the traditional tongue-style bookends, such as described in U.S. Pat. No. 4,637,632. The bookends are supported by sheets that extend in both directions of the bookend, and are commonly cast from sheet steel or other light-weight materials. A variation of this is the free standing L-style, which also usually includes a soft-bottom friction pad of cork, rubber, plastic, or foam. Due their light weights, however, these styles suffer the drawback of requiring an auxiliary weight to hold them in place. Such weights maybe cut rock weights, cast steel weights, or more commonly, the weight of the books held in place. When the books are used to provide support for the bookends, the ability to adjust the bookends is hindered. Typically, several of the books must be removed before a bookend may be moved, resulting in a tedious and time consuming process to adjust the media rack.

Another variation of the tongue-style and L-style includes magnets that can hold the metal bookends in place when used on metal surfaces, such as metal shelves and file cabinets. However, such media racks are limited in use to such surfaces, and are not practical on wood shelves or desks.

Other types of media racks include large weighted bookends, which by their nature, are capable of supporting the media by their inherent weight. These bookends, however, are typically large and cumbersome, and limit the visible display of the books. As such, such bookends are not ideal where the bookshelf appearance of stored books is important. Moreover, due to their size, such bookends tend to take up a large amount of clearance at each end of the displayed books. This becomes a serious inconvenience when space is limited.

Another media rack design is the divider style, such as described in U.S. Pat. Nos. 5,111,940, 5,205,420, and 5,555,990, which can be built into bookshelves, such as commercial library storage shelves, or built into a base tray. This design can have single or multiple lateral support dividers, usually mounted in slots either above, behind, or below the books being contained. This design, however, is limited to requiring a base surface or tray to support the media. A variation of this is the oblique-angle cradle, such as described in U.S. Pat. No. 4,887,725, which incorporates lateral supports attached to a base that holds the media at an oblique angle. Such a design also requires a base to support the lateral supports.

Despite the variety of media racks in existence, none of them adequately combine the need for effective and efficient media storage and display. The requirements to meet this need include criteria such as minimal usage of space, organizational appearance, immediate accessibility, appealing visibility of the stored media, cost-effectiveness, media volume flexibility, and attractiveness. Many current products begin to reach their limitations at approximately a dozen or so books, at which point the weight of skewed or tilted books starts to become difficult to control. A row of books exceeding a dozen becomes quite heavy to each book end, the result of a domino effect magnifying the resultant load imposed by the books at the ends of the row. The requirement to firmly hold and control each bookend, while at the same time inserting or removing books is often both a strength and acrobatic challenge that grows as the number of books increases. Large format books, a number of tall or thin books, and a variety of media types, weights, and sizes increase typical problems in media storage and retrieval.

Some current products appear to be a trade off between effectiveness and efficiency. For example, many of the products have highly efficient stability for holding the media in place. However, they also have a very high usage of space to create the stability, which is undesirable. Accordingly, there currently exists a strong need for a media holding device that is both effective and efficient for storing and displaying media.

BRIEF SUMMARY OF THE INVENTION

The present invention is a media holding device for supporting media in upright positions that combines the need for effective and efficient media storage and display. The present invention includes a vertical element and a horizontal extension element created from a continuous length of rod stock formed into segments. The vertical element is a plane defined by at least three corner points creating a geometric shape, for providing lateral support for the held media. The horizontal extension element extends from the vertical element perpendicularly to the plane, creating a horizontal plane for supporting the vertical element.

The present invention may also include a second vertical element and a second horizontal extension element for holding the media between the vertical element and the second vertical element. The present invention may further include connections between the horizontal extension element and the second horizontal extension element, for adjusting the distance between the vertical element and the second vertical element. Such embodiments allow the present invention to adapt to various requirements for effective and efficient media storage and display.

BRIEF DESCRIPTION OF THE DRAWINGS

FIG. 2A is a perspective view of the first embodiment of the present invention.

FIG. 2B is a perspective view of an alternative design of the first embodiment of the present invention.

FIG. 2C is a perspective view of an alternative design of the first embodiment of the present invention.

FIG. 22A is a perspective view of a fourth embodiment of the present invention.

FIG. 22B is an exploded perspective view of the fourth embodiment of the present invention.

FIG. 23 is a perspective view an alternative design of the fourth embodiment of the present invention.

DETAILED DESCRIPTION

Figure 1A:
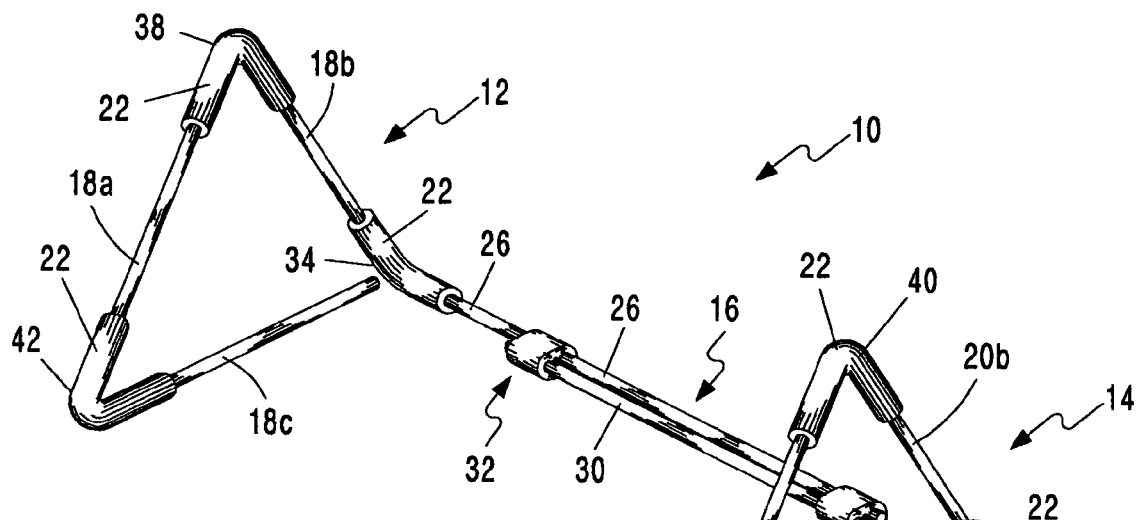
FIG. 1A is a perspective view of a first embodiment of the present invention.

FIG. 1A is a perspective view of a media holding device, generally designated as 10, configured in accordance with the first embodiment of the present invention. Media holding device 10 is an adjustable media rack for supporting media, and consists of left upright 12 and right upright 14 interconnected by double coupling arrangement 16. Left upright 12 is a vertical plane defined by point 34 located at a lower rear corner, point 42 located at a lower front corner, and point 38 located at an upper corner. Left upright 12 is created from a continuous length of rod stock formed into segments 18a, 18b, and 18c. Horizontal support shaft 26 is also an integral portion of the rod stock formed into segments 18a, 18b, and 18c. As such, segments 18a, 18b, and 18c and horizontal support shaft 26 are formed and finished from a continuous length of rod stock to constitute the structural framework of left upright 12 and horizontal support shaft 26.

Right upright 14 is also a vertical plane defined by point 36 located at a lower rear corner, point 44 located at a lower front corner, and point 40 located at an upper corner. Right upright 14 is created from a continuous length of rod stock formed into segments 20a, 20b, and 20c. Horizontal support shaft 30 is an integral portion of the rod stock formed into segments 20a, 20b, and 20c. Correspondingly, segments 20a, 20b, and 20c and horizontal support shaft 30 are formed and finished from a continuous length of rod stock to constitute the structural framework of right upright 14 and horizontal support shaft 30. As illustrated in FIG. 1A, the defined planes of left upright 12 and right upright 14 are triangular in shape.

Double coupling arrangement 16 is a slidably adjustable component, including horizontal support shafts 26 and 30, which are guided and held in adjustment by couplings 28 and 32. Horizontal support shafts 26 and 30 extend perpendicularly from the lower rear corners of left upright 12 and right upright 14, at points 34 and 36, respectively.

Corner sleeves 22 are frictional surfaces secured to left upright 12 and right upright 14, are preferably natural or synthetic rubber, for providing a soft cushioned contact with stored media items held between left upright 12 and right upright 14; and both a frictional and a non-marring contact with a horizontal mounting surface, such as a shelf or desktop (not shown). Couplings 28 and 32 act in tandem to guide horizontal support shafts 26 and 30 in parallel converging and diverging movements as left upright 12 and right upright 14 are adjusted either inward or outward to accommodate the dimensional requirements of the media retained.

Imposed forces from the media restrained between left upright 12 and right upright 14 are predominantly horizontal in nature, acting at the peak corners of the triangular shapes of left upright 12 and right upright 14, notably points 38 and 40. However, forces resisting the spreading of left upright 12 and right upright 14 are frictional at the base corners of left upright 12 and right upright 14, notably points at 34, 36, 42, and 44; and among component engagements throughout double coupling arrangement 16.

Resisting forces of double coupling arrangement 16 are transmitted generally through parallel horizontal axes of horizontal support shafts 26 and 30, defined by points 34 and 36. This is vertically and horizontally asymmetric to the location of imposed forces due to stored media, a horizontal axis defined by contact points 38 and 40. This asymmetry creates force moments within media holding device 10 that result in a unique combination of a simple and reliable adjustments of left upright 12 and right upright 14, while at the same time creating an exceptional resistance to undesirable spreading of left upright 12 and right upright 14 under imposed loading. This is important to product performance, as some media such as books are quite heavy in comparison to other media such as plastic CD and DVD storage (aka. "jewel" case) containers.

Figure 1B:
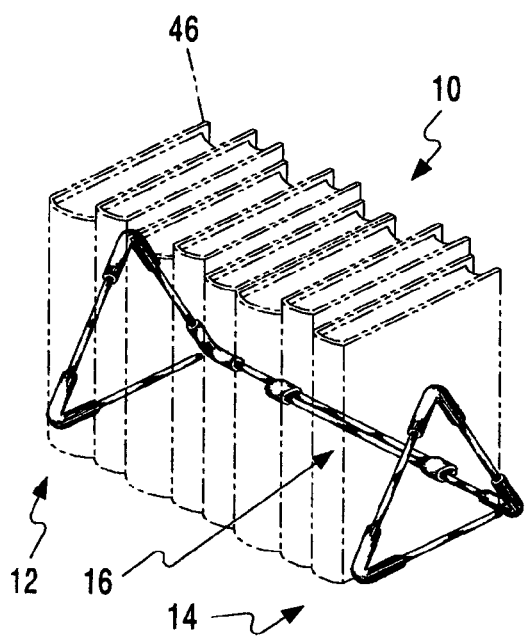
FIG. 1B is a perspective view of the first embodiment of the present invention in use.

FIG. 1B is a perspective view of media holding device 10, with a number of books 46 indicated by phantom lines, illustrating a useful application of media holding device 10 as described in FIG. 1A. As illustrated in FIG. 1B, media holding device 10 includes left upright 12, right upright 14, and double coupling arrangement 16. Double coupling arrangement 16 connects left upright 12 and right upright 14 as described in FIG. 1A, thereby providing several product advantages.

The connection between the left upright 12 and right upright 14 provides reciprocal leverage to each upright, effectively counteracting force loads imparted to left upright 12 and right upright 14 from the stored media such as books 46. Double coupling arrangement 16 is located behind books 46, thereby substantially hiding double coupling arrangement 16 from view during use. Additionally, the asymmetric location of double coupling arrangement 16 relative to left upright 12 and right upright 14 results in high frictional drag among double coupling arrangement 16, effectively retaining left upright 12 and right upright 14 in place at all adjusted positional settings. These features are of primary importance, as stored books may be a primary application, and product function, space utilization, and aesthetic appearance are critical sales and application factors.

Figure 1C:
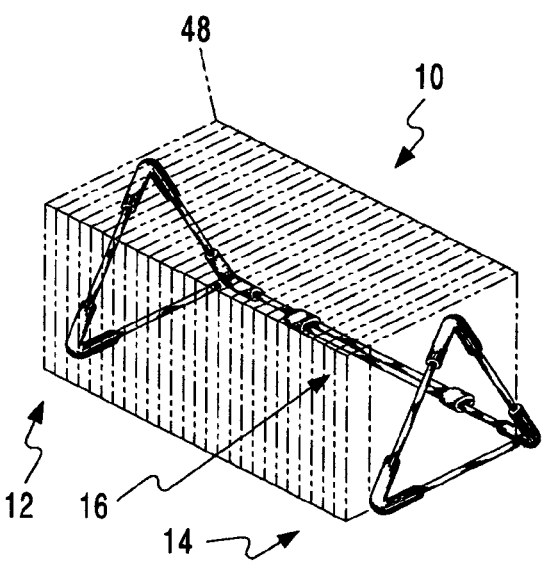
FIG. 1C is another perspective view of the first embodiment of the present invention in use.

FIG. 1C is another perspective view of media holding device 10 as described in FIG. 1A, with a number of electronic media storage cases 48 indicated by phantom lines. While books are relatively large and heavy media, disc storage cases are relatively smaller, lighter, and thinner. Storage problems are of a slightly different nature than typical book storage, as the narrow width, quantity, and the organization of such smaller items creates slightly different requirements than the greater size and weight of typical books held in retention.

Media holding device 10 again includes left upright 12, right upright 14, and double coupling arrangement 16. As used with other media, left upright 12 and right upright 14 captivate stored media 48 on either side, and are interconnected by horizontal coupling arrangement 16. Narrow media requires a finer adjustment of left upright 12 and right upright 14 as items are added and removed. The coupling arrangement of double coupling arrangement 16 provides for continuous adjustments, while previous products for this purpose commonly incorporate separated fixed slots or partitions for individual disc cases. Such previous designs are not space efficient, and as such, cannot accommodate wider disc cases that hold multiple discs, as these multiple-disc cases are often two or three times wider than single disc cases. Media holding device 10, however, accommodates various widths, sizes, and styles available in the marketplace; and easily accommodates a mix of books, CD cases, DVD cases, and other media. As such, media holding device 10 is not limited to a single media, or by the length, height, or width of the individual media items as are many previous products.

FIG. 2A is a perspective view of media holding device 10, illustrating the preferred range of adjustment available. Media holding device 10 includes left support 12 and right support 14 interconnected by double coupling arrangement 16. Left upright 12 is a vertical plane defined by point 34 located at a lower rear corner, point 42 located at a lower front corner, and point 38 located at an upper corner. Left upright 12 is created from a continuous length of rod stock formed into segments 18a, 18b, and 18c. Right upright 14 is also created from a continuous length of rod stock formed into segments 20a, 20b, and 20c.

Double coupling arrangement 16 includes horizontal support shafts 26 and 30 and couplings 28 and 32. Horizontal support shaft 26 is also an integral portion of the rod stock formed into segments 18a, 18b, and 18c of left upright 12, and is securely connected to coupling 28. Correspondingly, horizontal support shaft 30 is an integral portion of the rod stock formed into segments 20a, 20b, and 20c of right upright 14, and is securely connected to coupling 32. Left upright 12 and right upright 14 also include corner sleeves 22 for providing soft cushioned contact with stored media items, and both frictional and non-marring contact with a horizontal mounting surface.

As illustrated in FIG. 2A, left upright 12 and right upright 14 are adjustable in width via double coupling arrangement 16. Left upright 12 designated by the phantom lines illustrates the preferred maximum preferred range of adjustment available to media holding device 10. However, the present invention is not intended to be limited strictly to the positions shown. The unique asymmetric design of media holding device 10 provides for a firm and reliable converging and diverging adjustment of left upright 12 and right upright 14, while at the same time providing exceptional resistance to undesirable spreading of left upright 12 and right upright 14 under imposed loading. This combination provides a media storage device that is superior to and more versatile than previous media racks, which are typically lacking in one or both of these criteria.

FIG. 2B is a perspective view of the first embodiment, designated as media holding device 50, illustrating an alternative shape for the uprights. Media holding device 50 is an adjustable media support rack, similar to media holding device 10 in FIGS. 1A–1C and 2A, and includes left upright 52 and right upright 54 interconnected by double coupling arrangement 56.

Left upright 52 is a vertical plane defined by point 57a located at a lower rear corner, point 57b located at a lower front corner, point 57c located at an upper front corner, and 57d located at an upper rear corner. Left upright 52 is created from a continuous length of rod stock formed into segments 53a, 53b, 53c, and 53d. Right upright 54 is also a vertical plane defined by point 59a located at a lower rear corner, point 59b located at a lower front corner, point 59c located at an upper front corner, and point 59d located at an upper rear corner. Right upright 54 is also created from a continuous length of rod stock formed into segments 55a, 55b, 55c, and 55d. As illustrated in FIG. 2B, the defined planes of left upright 52 and right upright 54 are square in shape.

Left upright 52 and right upright 54 are adjustable via double coupling arrangement 56 in a manner identical to that of media holding device 10. Left upright 52 and right upright 54 also include corner sleeves 58 for providing soft cushioned contact with stored media items, and both frictional and non-marring contact with a horizontal mounting surface.

The square shape of left upright 52 and right upright 54 adds lateral (front-to-back) stability to stored media items at the points of imposed forces during applied use. While requiring a greater amount of material and forming operations than the basic triangular shape in media holding device 10, a square or rectangular shape in media holding device 50 is beneficial to support wider stored media, as it provides a wide pattern of force distribution. As such, media holding device 50 is very effective for use with large-format books and other such media when lateral (front-to-back) alignment and stability are important.

FIG. 2C is a perspective view of the first embodiment, designated as media holding device 60, illustrating a second alternative shape for the uprights. Media holding device 60 is an adjustable media support rack, also similar to media holding device 10, and includes left upright 62 and right upright 64 interconnected by double coupling arrangement 66.

Left upright 62 is a vertical plane defined by point 63a located at an upper front corner, point 63b located at a lower front corner, and point 63c located at a lower rear corner. Right upright 64 is also a vertical plane defined by point 65a located at an upper front corner, point 65b located at a lower front corner, and point 65c located at a lower rear corner. As illustrated in FIG. 2C, the defined planes of left upright 62 and right upright 64 created an L-shape with a forward extending horizontal base section and an upward extending vertical post section.

Left upright 62 and right upright 64 are adjustable via double coupling arrangement 66 in a manner identical to that of media holding device 10. Left upright 62 and right upright 64 also include corner sleeves 68 and end sleeves 70. Corner sleeves 68 provide soft cushioned contact with stored media items, and both frictional and non-marring contact with a horizontal mounting surface. End sleeves 70, while not in contact with the horizontal mounting surface, correspondingly provide soft cushioned contact with stored media items.

The distinction between media holding device 10 and media holding device 60 is that the L-shaped plane replaces the triangular plane of the uprights. The L-shape requires less materials and forming operations than a triangular shape, but provides less lateral (front-to-back) stability as the contact pattern is much narrower. Nonetheless, this alternative offers a minimal footprint, lower materials and fabrication costs, and reduces the "visual" space occupied. Aesthetics play a key role in product success, and this shape alternative offers a distinctive "less-is-more" quality, typical of contemporary furniture styles. Many other variations in the design of the uprights are known to those skilled in the art, including shape and style variations incorporating novel, ornamental, or customer-specific designs. Examples are characters such as a dollar sign or paper clip, symbols such as an ampersand or musical clef, special finishes such as school-color themes, and corporate logos.

Figure 3:
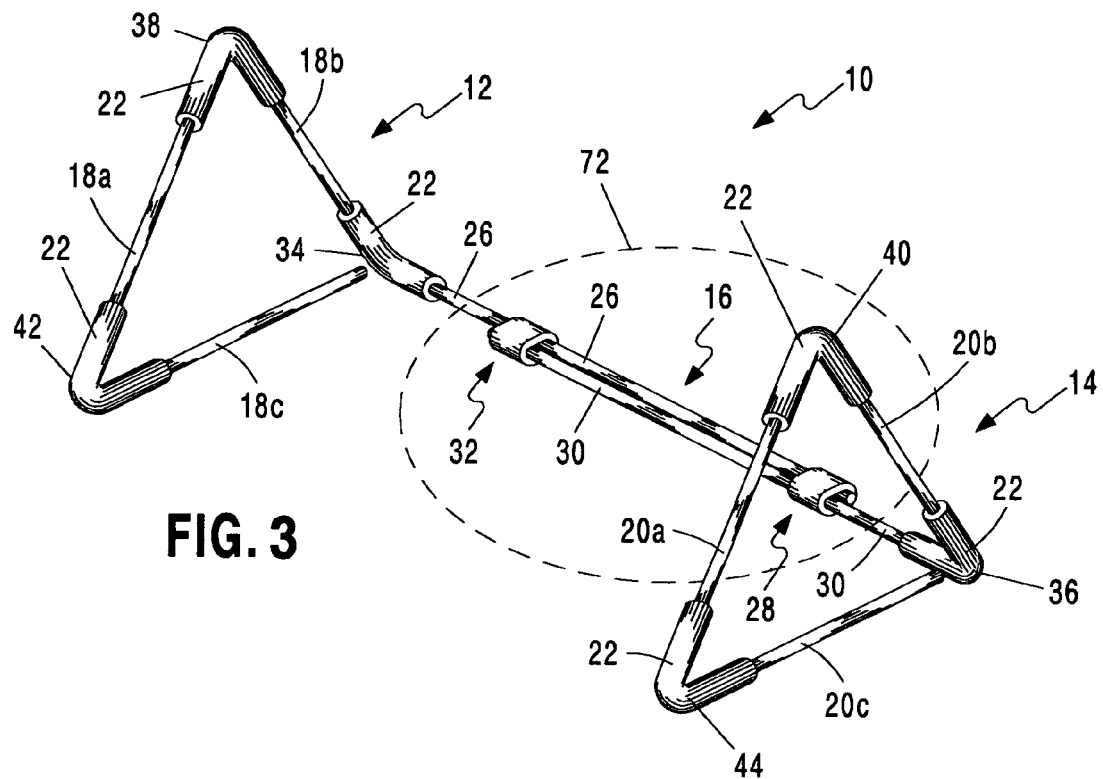
FIG. 3 is a perspective view of the first embodiment of the present invention.
Figure 4:
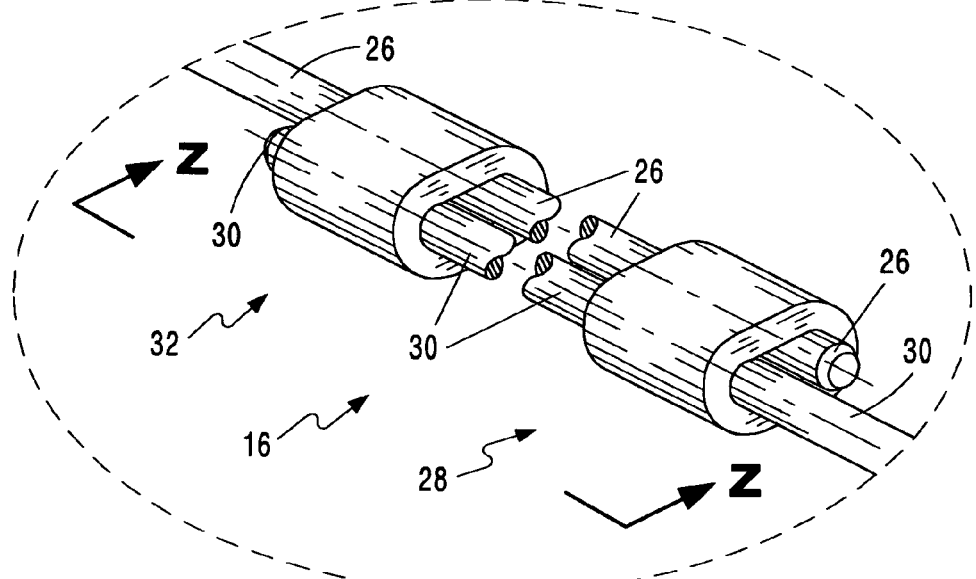
FIG. 4 is an enlarged perspective view of a portion of the first embodiment of the present invention, indicated by dashed line 72 in FIG. 3.
Figure 5:
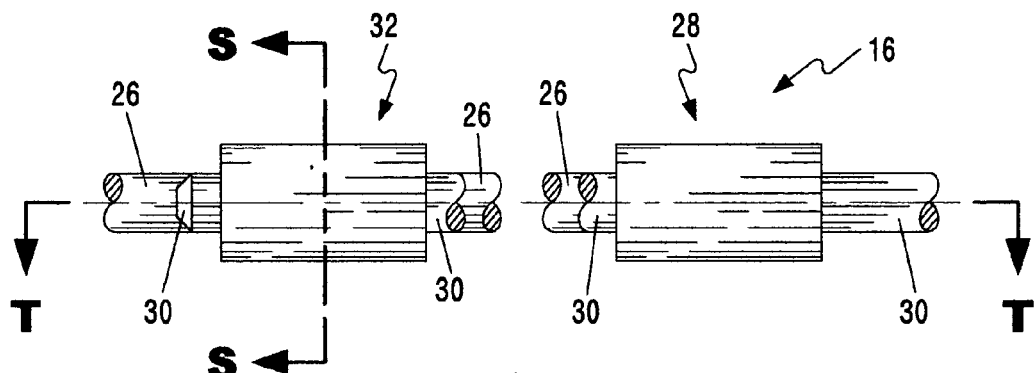
FIG. 5 is a front view of the first embodiment of the present invention shown in the direction of view line Z—Z in FIG. 4.

FIGS. 3–5 illustrate the components of double coupling arrangement 16 as incorporated in media holding device 10, and are also applicable to media holding devices 50 and 60. FIG. 3 is a perspective view of media holding device 10 as described in FIG. 1A, and includes left upright 12 and right upright 14, cornered with corner sleeves 22, and interconnected by double coupling arrangement 16. FIG. 3 further includes enlargement outline 72, which encompasses double coupling arrangement 16. FIG. 4 is an enlarged view of double coupling arrangement 16 within the dashed outline 72, and includes horizontal support shafts 26 and 30, couplings 28 and 32, and view line Z—Z. Correspondingly, FIG. 5 is a front view of double coupling arrangement 16 shown in the direction of view line Z—Z in FIG. 4 and includes horizontal support shafts 26 and 30, couplings 28 and 32, cut line S—S, and cut line T—T.

The capability of media holding device 10 to adjust the distance between left upright 12 and right upright 14 is based upon the interactions between horizontal support shafts 26 and 30 and couplings 28 and 32. As such, double coupling arrangement 16 is designated as incorporating parallel shaft couplings. Horizontal support shaft 26 is securely connected within coupling 28 and slidably extends through coupling 32. Correspondingly, horizontal support shaft 30 is securely connected within coupling 32 and slidably extends through coupling 28. The net effect of this arrangement is that horizontal support shafts 26 and 30 are parallel to each other, extending in opposite directions, and are capable of sliding relative to each other in converging and diverging motions, guided by couplings 28 and 32. The converging and diverging motions, in turn, adjust the distance between left upright 12 and right upright 14. To adjust the distance between left upright 12 and right upright 14, pulling or pushing pressure is applied at points 34 and 36 for a simple and continuous adjustment.

The pushing or pulling pressure applied at points 34 and 36 is predominantly in axial alignment with the parallel support shafts 26 and 30, interconnected by the double coupling arrangement 16. Such alignment minimizes the frictional resistance of the horizontal support shafts 26 and 30 within coupling arrangement 16, facilitating very simple and easy adjustment (i.e., the desired converging or diverging movement) of uprights 12 and 14. Further, a slight lifting pressure, applied at point 34 or 36 (either or both as preferred), eliminates any frictional surface contact at points 34 and 42, and/or at points 36 and 44. Therefore, a pulling or pushing pressure applied at points 34 and 36, combined with a slight lift at either or both points, minimizes the frictional resistance of coupling arrangement 16, easing movement of uprights 12 and 14 as they are adjusted either inward or outward. In contrast, pressure applied at points 38 and 40 (as induced by stored media), is predominantly in "non-axial" (i.e., asymmetrical) alignment with respect to the double coupling arrangement 16 of support shafts 26 and 30. Such "misalignment" induces bending moments both in and among the coupled components of double coupling arrangement 16, greatly increasing the frictional resistance (i.e., shaft and coupling "binding" tendencies) among the double coupling components to prevent unwanted spreading (i.e., the undesired diverging movement) of uprights 12 and 14 in applied use. Surface friction at points 34, 42, 36, and 44 adds to the resistance, effectively "locking" the uprights at any set adjustment during use. Outward pressure, induced by stored media at points 38 and 40, heightens the frictional resistance of uprights 12 and 14 to unwanted movement. Resistance to movement of uprights 12 and 14 is thereby very low in adjustment, while at the same time, very high in applied use.

Couplings 28 and 32 additionally function as end stops for defining the minimum and maximum distances media holding device 10 can be adjusted. When left upright 12 and right upright 14 are moved outward, horizontal support shafts 26 and 30 diverge, pulling couplings 28 and 32 closer together. The maximum width between left upright 12 and right upright 14 then occurs when couplings 28 and 32 contact each other. Similarly, when left upright 12 and right upright 14 are moved inward, horizontal support shafts 26 and 30 converge, forcing couplings 28 and 32 farther apart. The minimum width between left upright 12 and right upright 14 then occurs when coupling 28 contacts corner sleeve 22 located at point 36 and when coupling 32 contacts corner sleeve 22 located at point 34.

The use of parallel shaft sleeved couplings in media holding device 10 provides for a simple and continuous adjustment of left upright 12 and right upright 14. This is important as the ease of adjustment is an important factor in product performance. The parallel shaft arrangement also provides structural strength as a "double-beam" that resists upward defection of double coupling arrangement 16 induced by loads at points 38 and 40 imposed by stored media. It should be noted that, although the "double-beam" is shortened as the adjustment of uprights 12 and 14 is widened, the reciprocal leverage of shafts 26 and 30 also increase (acting as longer lever arms) with such adjustment, counteracting the effect.

Figure 6:
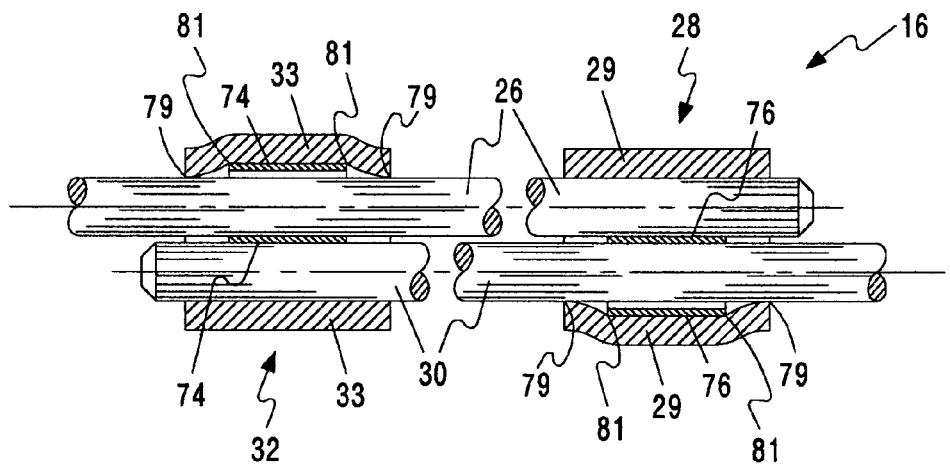
FIG. 6 is a sectional view of the first embodiment of the present invention taken along line T—T in FIG. 5.

FIG. 6 is a sectional view of double coupling arrangement 16 taken along line T—T in FIG. 5 and shows horizontal support shafts 26 and 30, couplings 28 and 32, coupling sleeves 29 and 33, and guide bushings 74 and 76. As discussed in FIG. 5, horizontal support shaft 26 is securely connected within coupling 28 and slidably extends through coupling 32, and horizontal support shaft 30 is securely connected within coupling 32 and slidably extends through coupling 28. Coupling sleeves 29 and 33 are elastic and function as resilient retaining housings, stretched over each set of coupling components as shown, and held in place by the resulting "hoop-stress" within each sleeve; thereby holding and fixing in place the arrangement of components shown as coupling assemblies 28 and 32.

In coupling assembly 32, coupling sleeve 33 is stretched over guide bushing 74 and shaft 30, thereby securing locations of coupling sleeve 33 and guide bushing 74 on the surface of shaft 30. Shaft 30 and guide bushing 74 are more rigid compared to coupling sleeve 33. Coupling sleeve 33, being elastic in nature, conforms readily to the shape of the more rigid components it surrounds, namely shaft 30 and guide bushing 74. A stretch in coupling sleeve 33 keeps shaft 30, coupling sleeve 33, and guide bushing 74 firmly fixed in the relative positions as shown. Coupling sleeve 33, being stretched around shaft 30 and guide bushing 74, securely connects coupling sleeve 33, guide bushing 74, and shaft 30 together by surface friction between all three components.

A substantial radial wrap of coupling sleeve 33 around both guide bushing 74 and shaft 30 provide a reliable fixed connection of shaft 30, coupling sleeve 33, and guide bushing 74. Tensile deformation of coupling sleeve 33 also creates surface discontinuities at points 81, and further assures a reliable fixed connection. Guide bushing 74, being shorter than coupling sleeve 33, provides an overlap of coupling sleeve 33 from point 81 to point 79 at each end of coupling sleeve 33. The stretch of coupling sleeve 33 and the length of the overlap creates frictional contact between coupling sleeve 33 and shaft 26 at points 79. This contact pushes slidable shaft 26 against the opposite side of the inside diameter of guide bushing 74, thereby removing free play of shaft 26 within guide bushing 74, and creating mild frictional drag at points 79 and between slidable shaft 26 and guide bushing 74.

Likewise, coupling sleeve 29 is stretched around both shaft 26 and guide bushing 76, securing fixed locations of coupling sleeve 29 and guide bushing 76 on the surface of shaft 26. Shaft 26 and guide bushing 76 are more rigid compared to coupling sleeve 29. Coupling sleeve 29, being highly elastic in nature, conforms readily to the shape of the more rigid components it surrounds, namely shaft 26 and guide bushing 76. A substantial stretch in coupling sleeve 29 keeps shaft 26, coupling sleeve 29, and guide bushing 76 firmly fixed in the relative positions, as shown. Coupling sleeve 29, being stretched around shaft 26 and guide bushing 76, securely connects coupling sleeve 29, guide bushing 76, and shaft 26 together by surface friction between all three components.

A substantial radial wrap of coupling sleeve 29 around both guide bushing 76 and shaft 26 provide a reliable fixed connection of shaft 26, coupling sleeve 29, and guide bushing 76. Tensile deformation of coupling sleeve 33 also creates surface discontinuities at points 81, and further assures a reliable fixed connection. Guide bushing 76, being shorter than coupling sleeve 29, provides an overlap of coupling sleeve 29 from point 81 to point 79 at each end of coupling sleeve 29. The stretch of coupling sleeve 29 and the length of the overlap creates frictional contact between coupling sleeve 29 and shaft 30 at points 79. This contact pushes slidable shaft 30 against the opposite side of the inside diameter of guide bushing 76, thereby removing free play of shaft 30 within guide bushing 76, and creating mild frictional drag at points 79 and between slidable shaft 30 and guide bushing 76.

Coupling assemblies 28 and 32 also provide frictional resistance to undesirable spreading of left upright 12 and right upright 14 under imposed loading. As forces imposed from the stored media act at peak corners of points 38 and 40, as described in FIG. 1A, the strain on left upright 12 and right upright 14 flex horizontal support shafts 26 and 30. This flexing increases friction between horizontal support shafts 26 and 30 and guide bushings 74 and 76, respectively. Thus, as the media imposes force on left upright 12 and right upright 14, the increased friction prevents horizontal support shafts 26 and 30 from sliding, and correspondingly allows left upright 12 and right upright 14 to resist spreading. This combination of allowing a low resistance to adjustment and a high resistance to media imposed forces provides for an efficient and effective use that is not found in previous media support racks.

Figure 7:
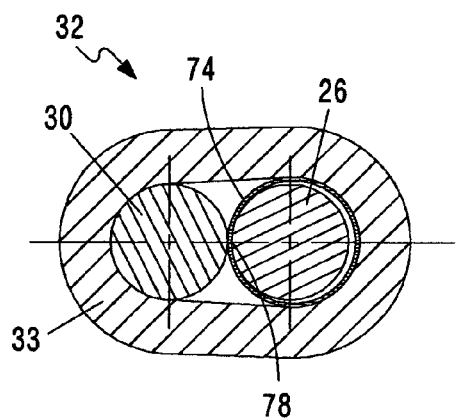
FIG. 7 is a sectional view of the first embodiment of the present invention taken along line S—S in FIG. 5.

FIG. 7 is a sectional view of double coupling arrangement 16 taken along line S—S in FIG. 5, and shows the fixed connections of coupling sleeve 33 and guide bushing 74 to shaft 30; and the sliding fit of shaft 26 within guide bushing 74. The use of coupling sleeve 33 secures a fixed connection of the both coupling sleeve 33 and guide bushing 74 to shaft 30, while simultaneously providing clearance for a sliding connection with shaft 26. This configuration effectively reduces assembly tolerances, as tolerances of flexible materials are typically far greater than those of rigid materials.

Rigid materials typically have a narrow fabrication tolerance, but very high material spring rates (i.e., little shape conformance). Natural and synthetic rubber compounds, on the other hand, have a very wide tolerance, with very low material spring rates and very high shape conformance. These very different qualities are each greatly utilized in this configuration, combining the high tolerance qualities of shafts 26 and 30, and guide bushing 74; and the high flexibilty and conformance qualities of coupling sleeve 33 very effectively. The rigid parts effectively control the form and fit tolerances of the components, while the high elasticity of the sleeve 33 effectively locks shaft 30, coupling sleeve 33, and guide bushing 74 in place while providing shaft 26 a sliding fit. Highly disparate material qualities are thereby combined in concert. As illustrated in FIGS. 6 and 7, guide bushing 74 is captivated by coupling sleeve 33, and may provide a single line contact with horizontal support shaft 26 as shown at point 78. The single line contact creates a comfortable and effective balance between frictional drag and slidability.

FIGS. 8 and 9A–9D are sectional views of horizontal support shafts 26 and 30, coupling 32, coupling sleeve 33, and guide bushing 74, taken along line S—S in FIG. 5, illustrating alternative designs for guide bushing 74 and coupling 32. FIGS. 10A–10F, and 11A–11B are sectional views of horizontal support shafts 26 and 30, taken along line S—S in FIG. 5, illustrating alternative designs for coupling 32 in a "solid body" construction. A shared center wall 94 is utilized in each of these examples. While FIGS. 7, 8, 9A–9D, 10A–10F, and 11A–11B only illustrate the components interacting with coupling 32, analogous designs of coupling 28 for use with horizontal support shaft 30 are also intended.

It is preferable to incorporate a modest resisting drag within coupling arrangement 16 as adjustments are performed. This "feel" (i.e., "tactile" aesthetics) is an important element of product quality as well as actual physical operating performance. Free play (i.e., looseness) in the couplings is detrimental, both in "feel" during adjustment as well as in actual "in-use" performance. A great deal of attention has been focused strictly upon the "feel" of the adjustment, as this is a very important piece of product quality. Each of the following figures addresses these important considerations, and shows an example of a viable alternative for engaging horizontal support shaft 26 within coupling 32.

Figure 8:
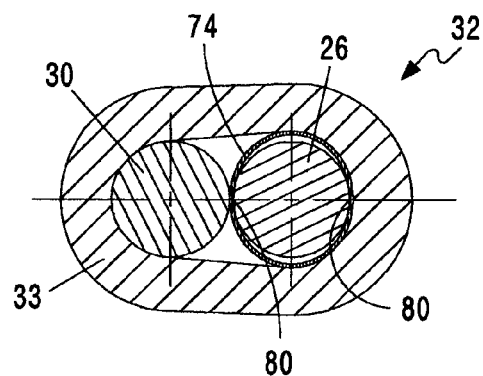
FIG. 8 is a sectional view of an alternative design of the first embodiment of the present invention taken along line S—S in FIG. 5.

As illustrated in FIG. 8, guide bushing 74 may be alternatively resilient in nature and provide dual-line contact with horizontal support shaft 26 as shown at points 80. Such dual-line contact can increases the amount of frictional drag compared to the single line contact, but still provides for a quality sliding adjustment. A polymer bushing can provide very effective form, fit, and frictional "feel" requirements, but polymer materials are typically subject to creep, and therefore lose resiliency over time. This tendency may (or may not) be acceptable in the marketplace. Guide bushing 74, in this configuration may therefore be a metal material, fabricated in such manner as to suitably control the frictional drag of horizontal support shaft 26 when sliding. Such fabrications of guide bushing 74 may include a slotted wall (i.e., C-shaped or "split" bushing) design, the slot being incorporated parallel to the sliding movement of horizontal support shaft 26 so as to provide suitable spring action to counterbalance the compressing radial forces of coupling sleeve 33, thereby enabling operation within an acceptable range of frictional drag.

Figure 9A:
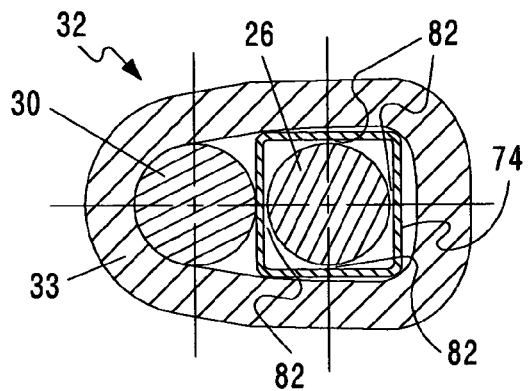
FIG. 9A is a sectional view of an alternative design of a double coupling arrangement of the first embodiment of the present invention taken along line S—S in FIG. 5.
Figure 9B:
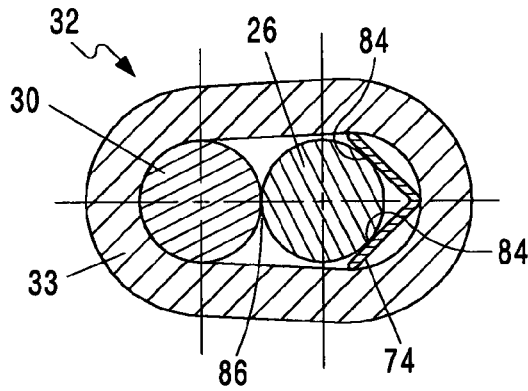
FIG. 9B is a sectional view of an alternative design of a double coupling arrangement of the first embodiment of the present invention taken along line S—S in FIG. 5.
Figure 9C:
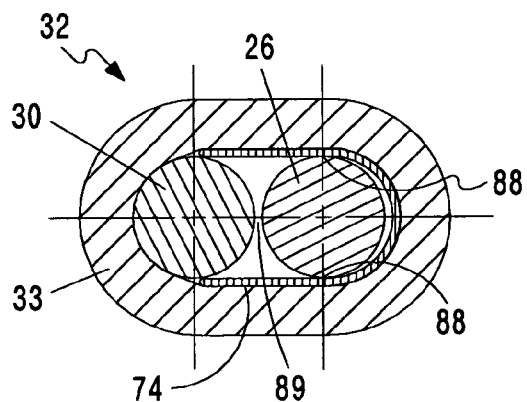
FIG. 9C is a sectional view of an alternative design of a double coupling arrangement of the first embodiment of the present invention taken along line S—S in FIG. 5.
Figure 9D:
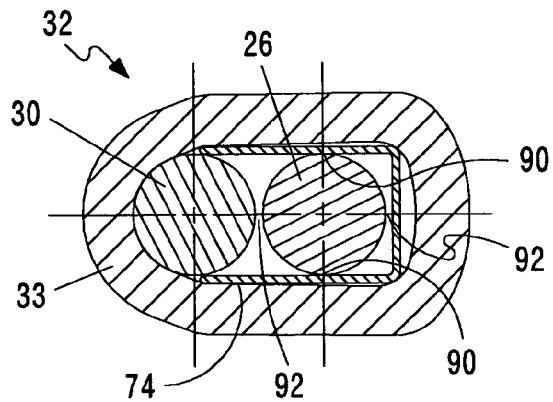
FIG. 9D is a sectional view of an alternative design of a double coupling arrangement of the first embodiment of the present invention taken along line S—S in FIG. 5.

FIGS. 9A–9D are additional alternative sectional views of coupling 32, including horizontal support shafts 26 and 30, coupling sleeve 33, and guide bushing 74 taken along line S—S in FIG. 5. In lieu of a circular-shape, FIG. 9A illustrates guide bushing 74 as a square tube, FIG. 9B illustrates guide bushing 74 as a V-shaped member, FIG. 9C illustrates guide bushing 74 as a rounded C-shaped channel, and FIG. 9D illustrates guide bushing 74 as a squared C-shaped channel.

The use of these different shapes for guide bushing 74 also provide for different amounts of frictional drag when horizontal support shaft 26 slides through guide bushing 74 and coupling sleeve 33. For example, in FIG. 9A, horizontal support shaft 26 is capable of contacting guide bushing 74 at one or more locations, as shown at points 82. In FIG. 9B, guide bushing 74 may provide a dual-line contact with the surface of horizontal support shaft 26, as shown at points 84, and horizontal support shaft 30 may also provide an additional single line contact with the surface of horizontal support shaft 26, as shown at point 86.

The designs in FIGS. 9C and 9D are similar to FIG. 9B, but provide for a greater amount of movement for horizontal support shaft 26. As illustrated in FIG. 9C, guide bushing 74 may provide a dual-line contact with the surface of horizontal support shaft 26 as shown at points 88. Horizontal support shaft 30 may also provide an additional single line contact with the surface of shaft 26 at point 89. Similarly, in FIG. 9D, guide bushing 74 may provide a dual-line contact with the surface of horizontal support shaft 26 as shown at points 90. Moreover, either horizontal support shaft 30 or guide bushing 74 may also provide an additional single line contact with the surface of horizontal support shaft 26 as shown at points 92. As such, these alternative designs for guide bushing 74 provide for different amounts of frictional drag, which vary the balance between ease of adjustment, the tactile "feel" of the adjustment, and reliable "in-use" retention of the set adjustment.

In FIGS. 9B–9D, it is noted that horizontal support shaft 30 is not pressed against coupling sleeve 33 by guide bushing 74, as is found in FIGS. 7, 8, and 9A. Nonetheless, horizontal support shaft 30 is secured to coupling 32 due to the mechanical retention of coupling sleeve 33. Coupling sleeve 33, preferably being made of a natural or synthetic rubber, has a greater surface friction on shaft 30 and guide bushing 74 than shaft 26 has on shaft 30 and guide bushing 74. Therefore, while horizontal support shaft 26 is capable of sliding relative to guide bushing 74, horizontal support shaft 30 is frictionally secured to coupling sleeve 33, allowing coupling 32 to guide the sliding movement of horizontal support shaft 26.

FIGS. 10A–10F are additional alternative sectional views of coupling 32, including horizontal support shafts 26 and 30, taken along line S—S in FIG. 5, with emphasis on alternative designs for coupling 32. Again, it is highly preferable to incorporate a modest resisting drag within each coupling as adjustments are performed. The designs in FIGS. 10A–10G also addresses these important considerations, and provide additional examples of viable alternatives for engaging horizontal support shaft 26 within coupling 32.

As illustrated in FIGS. 10A–10F, coupling 32 is an alternative "dual-sleeve" design, having a shared center wall 94, which generally replaces the use of guide bushing 74. In each figure, horizontal support shaft 30 is fixed within a circular hole as shown, and held in place preferably by the "hoop-stress" of an interference fit. Those familiarly skilled in component assembly will recognize many common alternatives and trade-offs regarding ease-of-assembly and robust mechanical retention. The interface between horizontal support shaft 30 and coupling sleeve 33 is common to all the descriptions in FIGS. 10A–10F, which describe unique features of the interface between horizontal support shaft 26 and passageway 77 of coupling 32 in each figure.

Figure 10A:
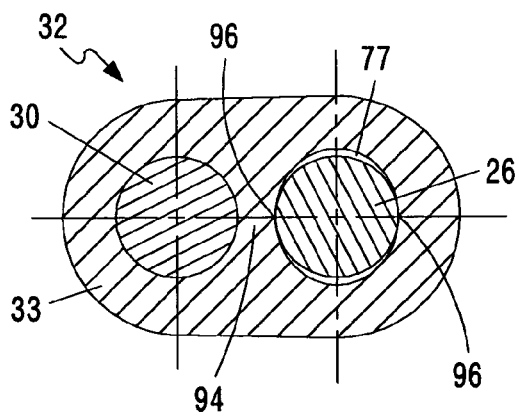
FIG. 10A is a sectional view of an alternative design of a double coupling arrangement of the first embodiment of the present invention taken along line S—S in FIG. 5.

FIG. 10A illustrates horizontal support shaft 26 slidably engaged within passageway 77 of coupling sleeve 33, which is oval-shaped, providing a light surface interference. The resiliency of the surface of coupling sleeve 33 creates a modest drag from line contact indicated by points 96.

Figure 10B:
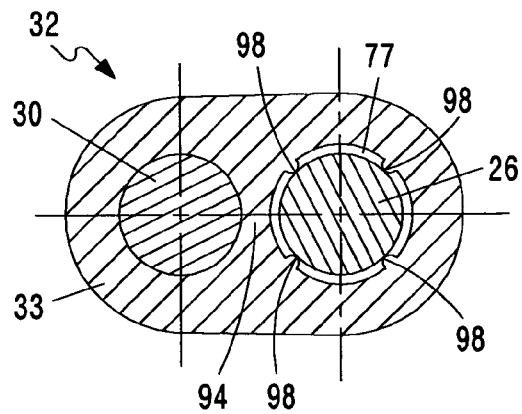
FIG. 10B is a sectional view of an alternative design of a double coupling arrangement of the first embodiment of the present invention taken along line S—S in FIG. 5.

FIG. 10B illustrates horizontal support shaft 26 slidably engaged within a passageway 77 of coupling sleeve 33, which is circular with rounded contacting ribs 98 located around the circumference. An interference fit combined with the frictional characteristics and resiliency of the surface of coupling sleeve 33 creates a modest drag during adjustment and a static frictional locking resistance after adjustment from the line contacts at rounded contacting ribs 98. Other forms of a ribbed profile may include shapes such as a star, spline, or a multi-lobed cloverleaf.

Figure 10C:
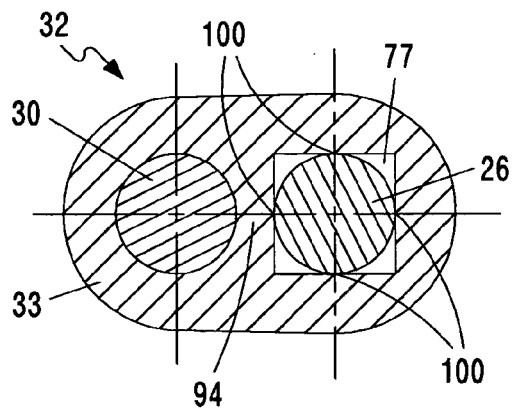
FIG. 10C is a sectional view of an alternative design of a double coupling arrangement of the first embodiment of the present invention taken along line S—S in FIG. 5.

FIG. 10C illustrates horizontal support shaft 26 slidably engaged within passageway 77 of coupling sleeve 33, which is square-shaped for providing a mild interference fit. Again, the resiliency of the surface of coupling sleeve 33 creates a modest drag from line contact at the flats of passageway 77, indicated by points 100.

Figure 10D:
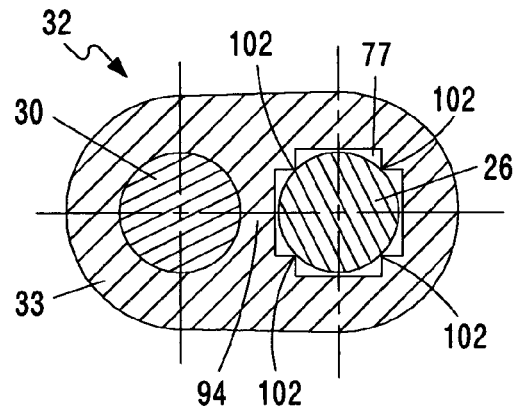
FIG. 10D is a sectional view of an alternative design of a double coupling arrangement of the first embodiment of the present invention taken along line S—S in FIG. 5.

FIG. 10D illustrates horizontal support shaft 26 slidably engaged within passageway 77 of coupling sleeve 33, which is square with sharp-edged ribs 102 protruding from the corners. An interference fit combined with the frictional characteristics and resiliency of the surface of coupling sleeve 33 creates a modest drag during adjustment and a static frictional locking tendency after adjustment from interaction at the surface contacts as shown at sharp-edged ribs 102, the asymmetric nature of force vectors, and the frictional resistance of surface interactions.

Figure 10E:
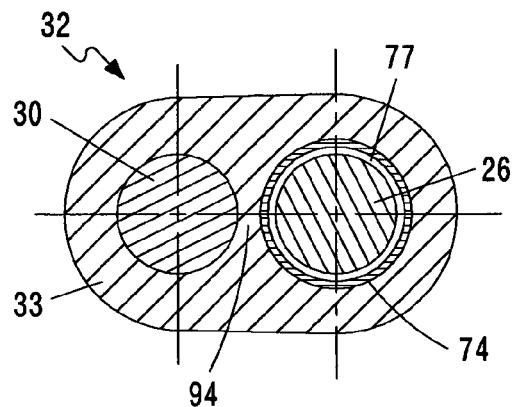
FIG. 10E is a sectional view of an alternative design of a double coupling arrangement of the first embodiment of the present invention taken along line S—S in FIG. 5.

FIG. 10E illustrates horizontal support shaft 26 slidably engaged within passageway 77 of coupling sleeve 33, which is circular and embeds guide bushing 74. Guide bushing 74 is held in place by a strong interference fit within passageway 77, and frictional contact is made between the "overhanging" ends of coupling sleeve 33 and horizontal support shaft 26. Such contact is made with the full circumference (360 degrees) on each end of passageway 77 as horizontal support shaft 26 slides through coupling sleeve 33 during adjustment. The frictional resistance is controlled by, among other factors, the length of guide bushing 74 compared to the length of coupling sleeve 33, the degree of interference, relative material properties, and the relative diameters of horizontal support shaft 26 and guide bushing 74.

Figure 10F:
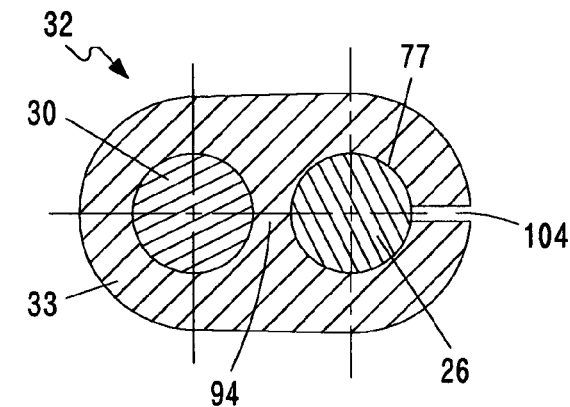
FIG. 10F is a sectional view of an alternative design of a double coupling arrangement of the first embodiment of the present invention taken along line S—S in FIG. 5.

FIG. 10F illustrates horizontal support shaft 26 slidably engaged within passageway 77 of coupling sleeve 33, which is circular and contains side slot 104. Although side slot 104 is shown with parallel sides, a variety of options such as V-shaped sides are available to provide ease of assembly combined with sound shaft retention qualities. Contact friction is determined by characteristics of contacting surfaces, the degree of interference in the fit, and the "spring" (resiliency) properties of material of coupling sleeve 33. This approach has the unique feature of permitting a "lateral" coupling assembly (i.e., sliding shaft 26 "sideways" through side slot 104), thereby facilitating assembly and field service of double coupling assembly 16.

Each of the passageway profiles described in FIGS. 10A–10F can be achieved by molding individual separate parts for providing closer tolerance control, or through continuous extrusion processes, which are generally more economical, as each profile shown above is unchanged in shape and position in the axial direction. Each passageway option also provides differing levels of friction for adjustments, which as stated above, varies the ease of adjustment and the tactile qualities (i.e., "feel") of the adjustment. Each of the above-described designs provide for comfortable operating aesthetics and operating performance, including both visual and tactile aesthetics.

Figure 11A:
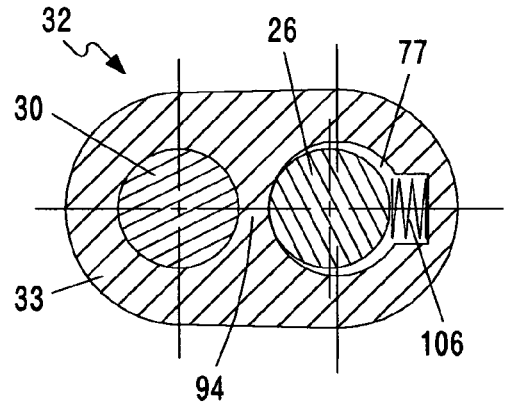
FIG. 11A is a sectional view of an alternative design of a double coupling arrangement of the first embodiment of the present invention taken along line S—S in FIG. 5.
Figure 11B:
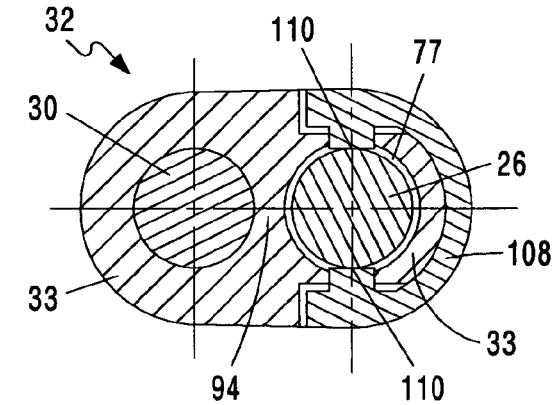
FIG. 11B is a sectional view of an alternative design of a double coupling arrangement of the first embodiment of the present invention taken along line S—S in FIG. 5.

FIGS. 11A and 11B are additional alternative sectional views of horizontal support shafts 26 and 30 and coupling sleeve 33, taken along line S—S in FIG. 5. Tolerance ranges of extruded parts are generally very wide compared to molded or machined parts. The previous alternative designs of coupling sleeve 33 in FIGS. 7–8, 9A–9D, and 10A–10F can be economically manufactured by extrusion, but extrusion tolerances are typically wide, and therefore can create variations in the frictional characteristics among contacting components. Nonetheless, each of the previous designs can be alternatively molded to reduce the impact of tolerances on variations in form, fit, and function. The following designs however, as described in FIGS. 11A and 11B cannot be achieved by extrusion, and are more appropriately achieved through an individually molded or machined coupling "body". In each figure described below, as in FIGS. 10A–10F, horizontal support shaft 30 is fixed within a circular passageway, shown consistently as positioned on the left. Likewise, horizontal support shaft 26 is consistently shown as positioned on the right, although these positions are appropriately reversed in each paired coupling assembly. FIGS. 11A and 11B also, as in FIGS. 10A–10F above, illustrate an example of a viable alternative for engaging horizontal support shaft 26, eliminating looseness and "free play" of horizontal support shafts 26 and 30 within coupling arrangement 16, and provide a modest drag within couplings 28 and 32 during adjustment, and an effective positional "lock" in use, as applied in the first embodiment of the invention.

FIG. 11A illustrates horizontal support shaft 26 slidably engaged within passageway 77 of coupling sleeve 33 that includes a "keyway" slot, "cup" or "pocket" that contains a "spring" contact element 106. The "spring" can be in the form of a coil spring (as shown in FIG. 11A), a flat (i.e., leaf) spring, or any suitable resilient material (e.g., in spherical or cylindrical "pellet" or rectangular "bar" form) that is suitably captivated by the configured parts assembly. A molded coupling "housing" for coupling sleeve 33 offers much tighter tolerances among assembled parts. A wide choice of spring materials, forms, and shapes makes this approach highly adaptable, making the resultant frictional drag and locking characteristics highly controllable.

FIG. 11B illustrates horizontal support shaft 26 slidably engaged within passageway 77 of coupling sleeve 33 that includes appropriate cut-outs for an external spring C-clip 108 to impart frictional drag to horizontal support shaft 26 at points 110. C-clip 108 can be of any suitable resilient material that facilitates assembly and imparts appropriate frictional resistance and locking tendencies to horizontal support shaft 26.

As described above, the various designs of coupling sleeves 29 and 33 and guide bushings 74 and 76 provide different methods to incorporate a modest resisting drag within double coupling arrangement 16 as adjustments are performed, while also providing resistance to undesirable spreading of left upright 12 and right upright 14 under imposed loading.

FIGS. 12–16 illustrate a special "housing" with a provision for frictional drag that cannot be achieved in extruded parts, but must rely upon individual mold cavities or separately machined parts. Collectively, FIGS. 12–16 define an alternative coupling design with passageways generally referred to as "oblique" holes, which incorporate non-parallel axes. Frictional drag is imparted to horizontal support shafts 26 and 30 (i.e., the slidable shafts) from interference fits with the edges of the passageways of coupling sleeves 29' and 33', through which horizontal support shafts 26 and 30 move.

Figure 12:
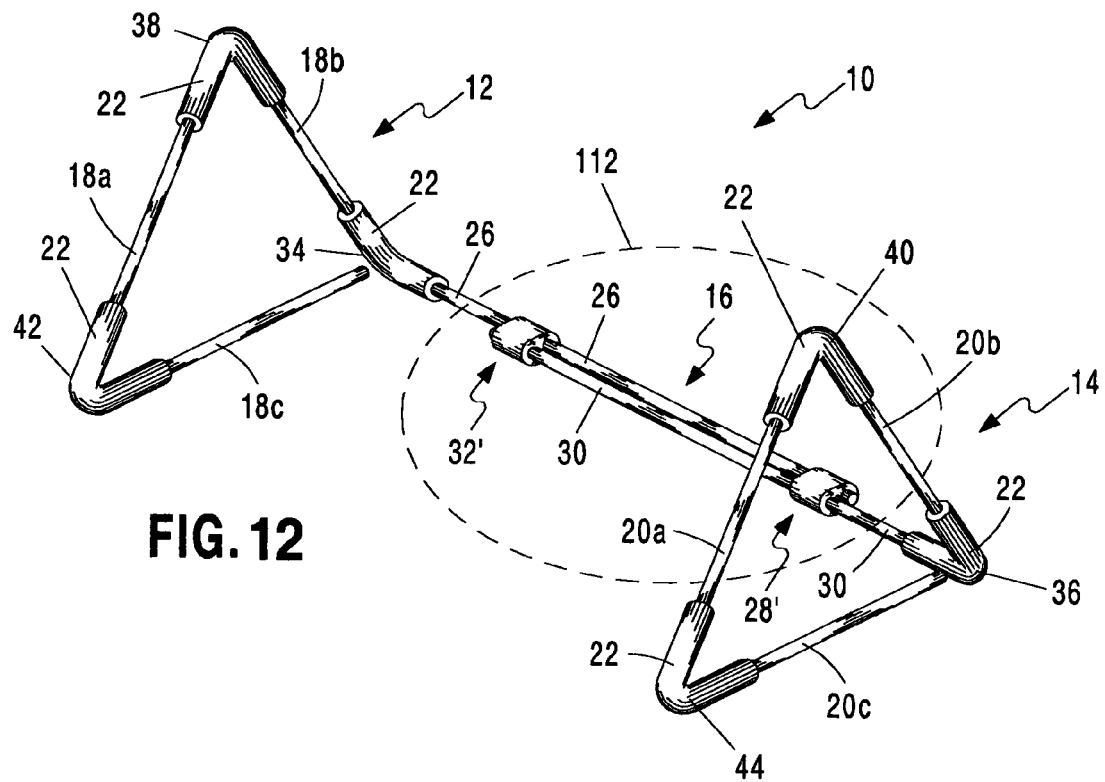
FIG. 12 is a perspective view of an alternative design of the first embodiment of the present invention.
Figure 13:
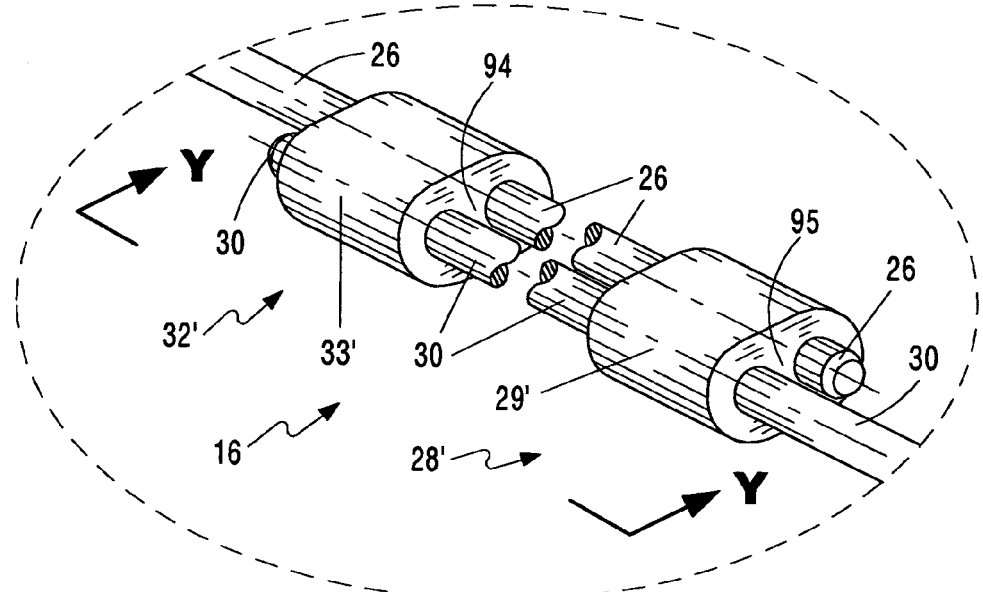
FIG. 13 is an enlarged perspective view of a portion of an alternative design of the first embodiment of the present invention, indicated by dashed line 112 in FIG. 12.
Figure 14:
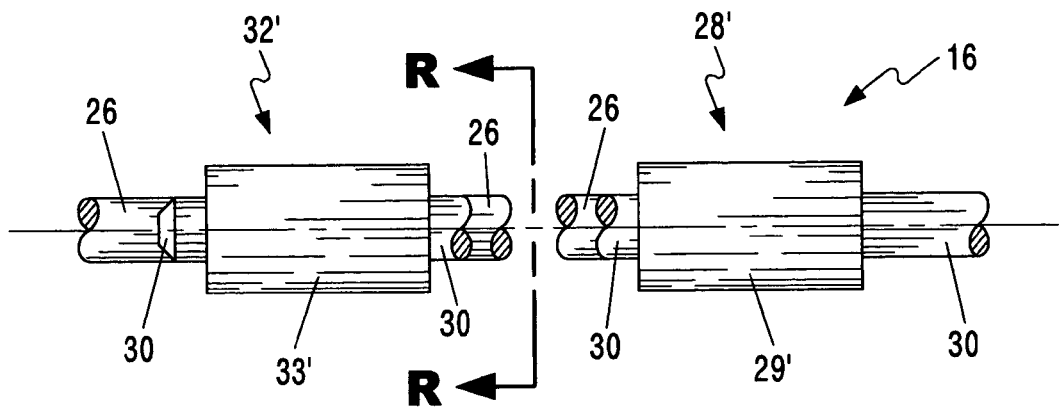
FIG. 14 is a front view of the alternative design of the first embodiment of the present invention shown in the direction of view line Y—Y in FIG. 13.

FIG. 12 is a perspective view of media holding device 10, and includes left upright 12 and right upright 14, cornered with corner sleeves 22, and interconnected by double coupling arrangement 16, as described in FIG. 1A. FIG. 12 further includes enlargement outline 112, which encompasses double coupling arrangement 16 incorporating the oblique hole design for couplings 28' and 32'. FIG. 13 is an enlarged perspective view of double coupling arrangement 16 of dashed outline 112, and includes horizontal support shafts 26 and 30, couplings 28' and 32', and view line Y—Y. As illustrated in FIG. 13, couplings 28' and 32' incorporate the alternative "dual-sleeve" design, having shared center walls 95 and 94, respectively. FIG. 14 is a front view of double coupling arrangement 16 taken along line Y—Y in FIG. 13 and includes horizontal support shafts 26 and 30, couplings 28' and 32', and cut line R—R.

As illustrated in FIGS. 13 and 14, horizontal support shaft 26 is securely connected within coupling sleeve 29' and slidably extends through coupling 32'. Correspondingly, horizontal support shaft 30 is securely connected within coupling sleeve 33' and slidably extends through coupling 28'. The net effect of this arrangement is that horizontal support shafts 26 and 30 are parallel to each other, extending in opposite directions, and are capable of sliding relative to each other in converging and diverging motions. The converging and diverging motions, in turn, adjust the distance between left upright 12 and right upright 14. Couplings sleeves 29' and 33' act as end stops for defining the minimum and maximum distance media holding device 10 can be adjusted in the manner described in FIGS. 4 and 5. The use of parallel shaft "sleeved" couplings provides for a combination of a simple and continuous adjustments of left upright 12 and right upright 14, while at the same time creating an exceptional resistance to undesirable spreading of left upright 12 and right upright 14 under imposed loading.

Figure 15:
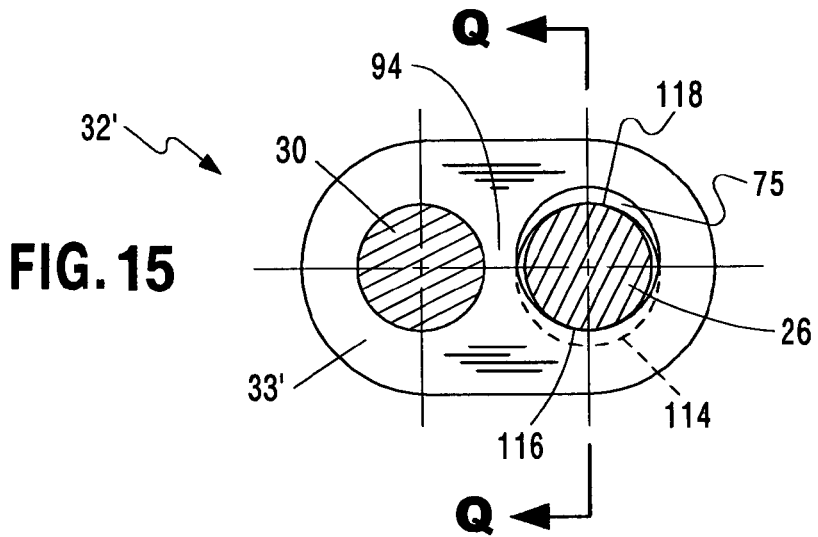
FIG. 15 is a sectional view of the alternative design of the first embodiment of the present invention taken along line R—R in FIG. 14.
Figure 16:
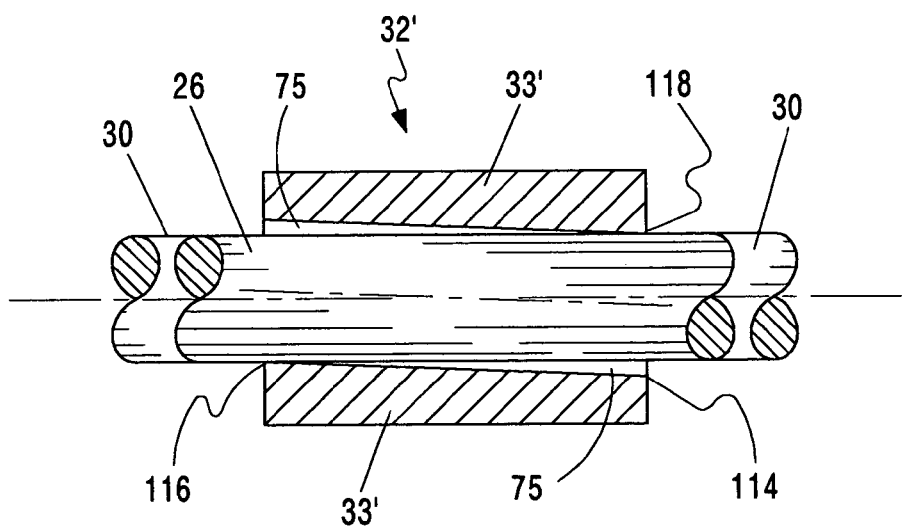
FIG. 16 is a sectional view of the alternative design of the first embodiment of the present invention taken along line Q—Q in FIG. 15.

FIGS. 15 and 16 illustrate the oblique hole design of coupling sleeve 33' pursuant to FIGS. 12–16. FIG. 15 is a sectional view taken along line R—R in FIG. 14, illustrating horizontal support shaft 26 slidably engaged within oblique hole passageway 75 of coupling sleeve 33', and further including cut line Q—Q. FIG. 16 is a sectional view taken along line Q—Q in FIG. 15 and also illustrates horizontal support shaft 26 slidably engaged within oblique hole passageway 75 of coupling sleeve 33'. While FIGS. 15 and 16 only illustrate the components interacting with coupling 32', analogous designs of coupling 28' for use with horizontal support shaft 30 are also intended.

Dotted line 114, illustrated in FIG. 15 and identified in FIG. 16, represents the edge of oblique hole passageway 75 on the rear side of coupling sleeve 33'. Frictional contact between horizontal support shaft 26 and oblique hole passageway 75 occurs at points 116 (front as shown) and 118 (rear as shown). Frictional drag is a result of an interference fit due to the intentional oblique alignment of oblique hole passageway 75. Such frictional drag is preferred over looseness in couplings to provide a better aesthetic (i.e., high quality) feel during adjustments as well as better in-use performance. Therefore, media holding device 10, as described in FIGS. 12–16, provides a media storage rack that is easy and aesthetically pleasing to adjust, while also providing resistance to undesirable spreading of left upright 12 and right upright 14 under imposed loading.

As previously described, FIGS. 7, 8, 9A–9D, 10A–10F, 11A–11B, and 12–16 illustrate the frictional means for providing guided frictional resistance to horizontal support shafts 26 and 30 when sliding to adjust the distance between first upright 12 and second upright 14.

Figure 17:
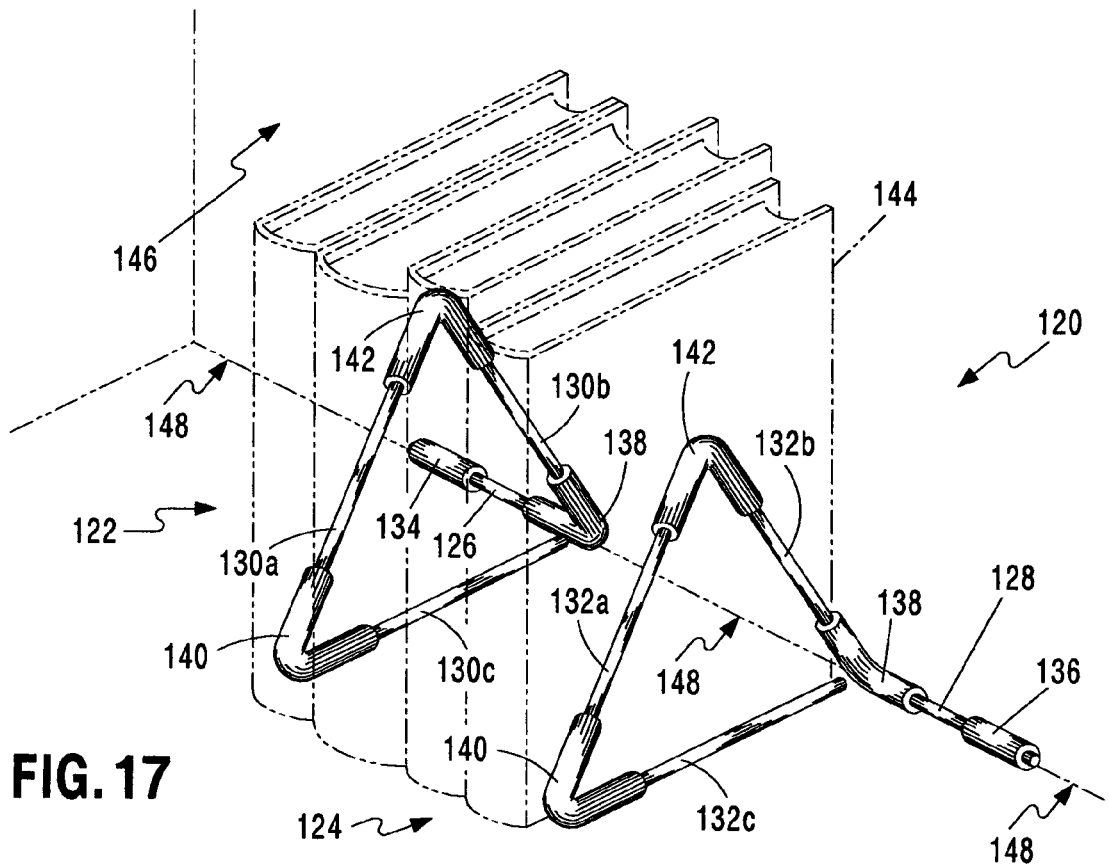
FIG. 17 is a perspective view of a second embodiment of the present invention.

FIG. 17 is a perspective view of a media holding device, generally designated as 120, configured in accordance with the second preferred embodiment of the invention. Also referred to as "Bookshelf End Frames", separate uprights 122 and 124 can be applied in pairs for retaining media 144 on horizontal surfaces such as in built-in bookshelves, bookcases, cabinets, and other surfaces containing horizontally rear corner 148.

Upright 122 is a vertical plane defined by a lower rear corner at corner sleeve 138, a lower front corner at corner sleeve 140, and an upper corner at corner sleeve 142. Upright 122 is created from a continuous length of rod stock formed into segments 130a, 130b, and 130c, defining a triangular shape. Horizontal support shaft 126 is also an integral portion of the rod stock formed into segments 130a, 130b, and 130c. As such, segments 130a, 130b, and 130c and horizontal support shaft 126 are formed and finished from a continuous length of rod stock to constitute the structural framework of upright 122 and horizontal support shaft 126. Horizontal support shaft 126 extends perpendicularly from upright 122 at the lower rear corner at corner sleeve 138, and along with segment 130c, creates a horizontal plane defined by the lower rear corner at corner sleeve 138, the lower front corner at corner sleeve 140, and end sleeve 134 on horizontal support shaft 126. This horizontal plane supports upright 122 and resists the imposed spreading forces of media 144 retained between uprights 122 and 124, as shown.

Upright 124 is also a vertical plane defined a lower rear corner at corner sleeve 138, a lower front corner at corner sleeve 140, and an upper corner at corner sleeve 142. Upright 124 is also created from a continuous length of rod stock formed into segments 132a, 132b, and 132c, defining a triangular shape. Horizontal support shaft 128 is also an integral portion of the rod stock formed into segments 132a, 132b, and 132c. Accordingly, segments 132a, 132b, and 132c and horizontal support shaft 128 are formed and finished from a continuous length of rod stock to constitute the structural framework of upright 124 and horizontal support shaft 128. Horizontal support shaft 128 extends perpendicularly from upright 124 at the lower rear corner at corner sleeve 138, and along with segment 132c, creates a horizontal plane defined by the lower rear corner at corner sleeve 138, the lower front corner at corner sleeve 140, and end sleeve 136 on horizontal support shaft 128. This horizontal plane supports upright 124 and resists the imposed spreading forces of media 144 retained between uprights 122 and 124, as shown.

Horizontal support shafts 126 and 128 interface with horizontally rear cornered surface 146 to resist the imposed spreading forces of media 144 retained between uprights 122 and 124, as shown. End sleeves 134 and 136, which are frictional surfaces secured to horizontal support shafts 126 and 128, combine with lower corner sleeves 138 and 140, which are frictional surfaces secured to uprights 122 and 124, to provide both frictional and non-marring contact with all horizontal and vertical contacting surfaces. Upper corner sleeves 142 provide soft cushioned contact with stored media 144, and absorb minute disturbances, such as slight misalignments and occasional minor surface vibrations such as from cover or door closings, which can sometimes loosen the hold in some environments.

Media holding device 120 actually becomes more effective as imposed forces increase, which may occur with heavy media such as books. The asymmetric leverage of horizontal support shafts 126 and 128, combined with a wide contact support base of uprights 122 and 124, and soft frictional lower corner sleeves 138 and 140, form an effective "wedge" into horizontally rear corner 148. This frictionally locks end sleeves 134 and 136 in place at horizontally rear corner 148 by the resultant downward and sideward force of media 144 retained between the uprights 122 and 124. As such, media holding device 120 is capable of being easily adjusted in width by a mere shifting of upright 122 and/or upright 124, while also being capable of resisting undesirable spreading of uprights 122 and 124 under imposed loading of heavy media.

Figure 18:
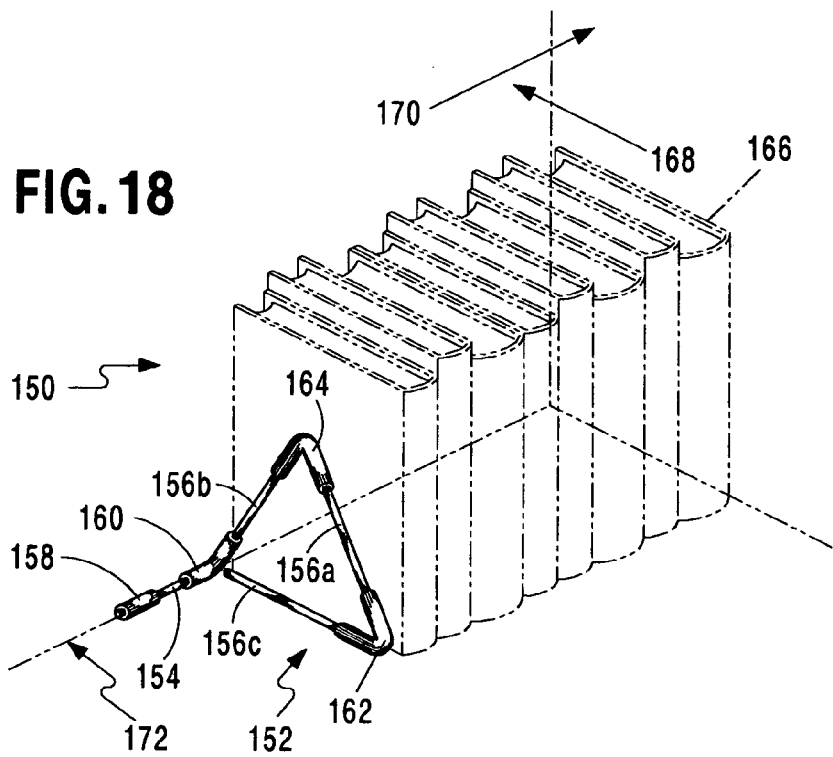
FIG. 18 is a perspective view of an alternative design of the second embodiment of the present invention.

FIG. 18 is a perspective view of singular upright device 150, also referred to as a "Bookshelf End Frame", applied for retaining media 166 on horizontal surfaces containing horizontally rear corner 172 between upright 152 and vertical side wall 170. This application keeps the center area of a shelf surface clear for other use.

Upright 152 is the vertical element of singular upright device 150, and is also a vertical plane defined a lower rear corner at corner sleeve 160, a lower front corner at corner sleeve 162, and an upper corner at corner sleeve 164. Upright 152 is also created from a continuous length of rod stock formed into segments 156a, 156b, and 156c, defining a triangular shape. Horizontal support shaft 154, the horizontal extension element of singular upright device 150, is also an integral portion of the rod stock formed into segments 156a, 156b, and 156c. As such, segments 156a, 156b, and 156c and horizontal support shaft 154 are formed and finished from a continuous length of rod stock to constitute the structural framework of upright 152 and horizontal support shaft 154. Horizontal support shaft 154 extends perpendicularly from upright 152 at the lower rear corner at corner sleeve 160, and along with segment 156c, creates a horizontal plane define by the lower rear corner at corner sleeve 160, the lower front corner at corner sleeve 162, and end sleeve 158 on horizontal support shaft 154. This horizontal plane supports upright 152 and resists the imposed spreading forces of media 166 retained between upright 152 and vertical side wall 170, as shown.

Singular upright device 150 functions much in the same manner as media holding device 120. Horizontal support shaft 154 interfaces with firm horizontally rear cornered surface 168 to resist the imposed spreading forces of media 166 retained between upright 152 and vertical side wall 170. End sleeve 158, which is a frictional surface secured to horizontal support shaft 154, combines with the lower corner sleeves 160 and 162, which are also frictional surfaces, to provide both frictional and non-marring contact with all horizontal and vertical contacting surfaces. Upper corner sleeve 164 is also a frictional surface and provides a soft cushioned contact with stored media 166, and also absorbs minute vibrational disturbances. As such, singular upright device 150 provides for simple adjustments to media width, while also resisting undesirable spreading of singular upright device 150 under imposed loading of heavy media.

Figure 19A:
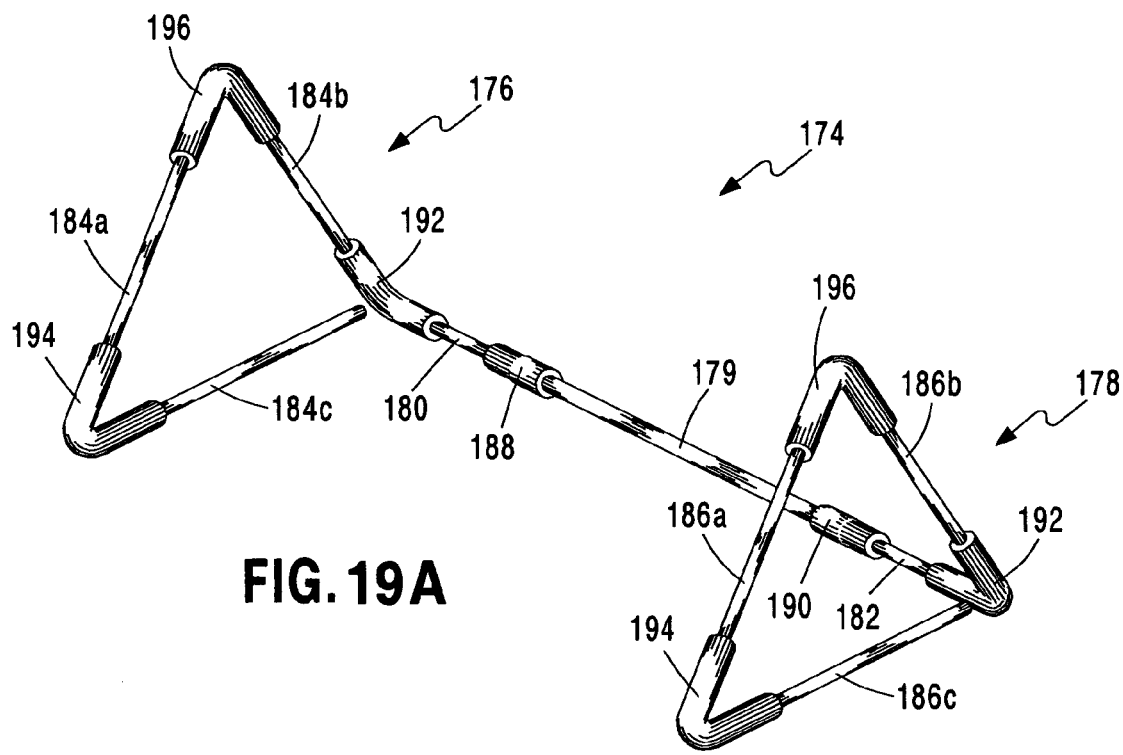
FIG. 19A is a perspective view of a third embodiment of the present invention.
Figure 19B:
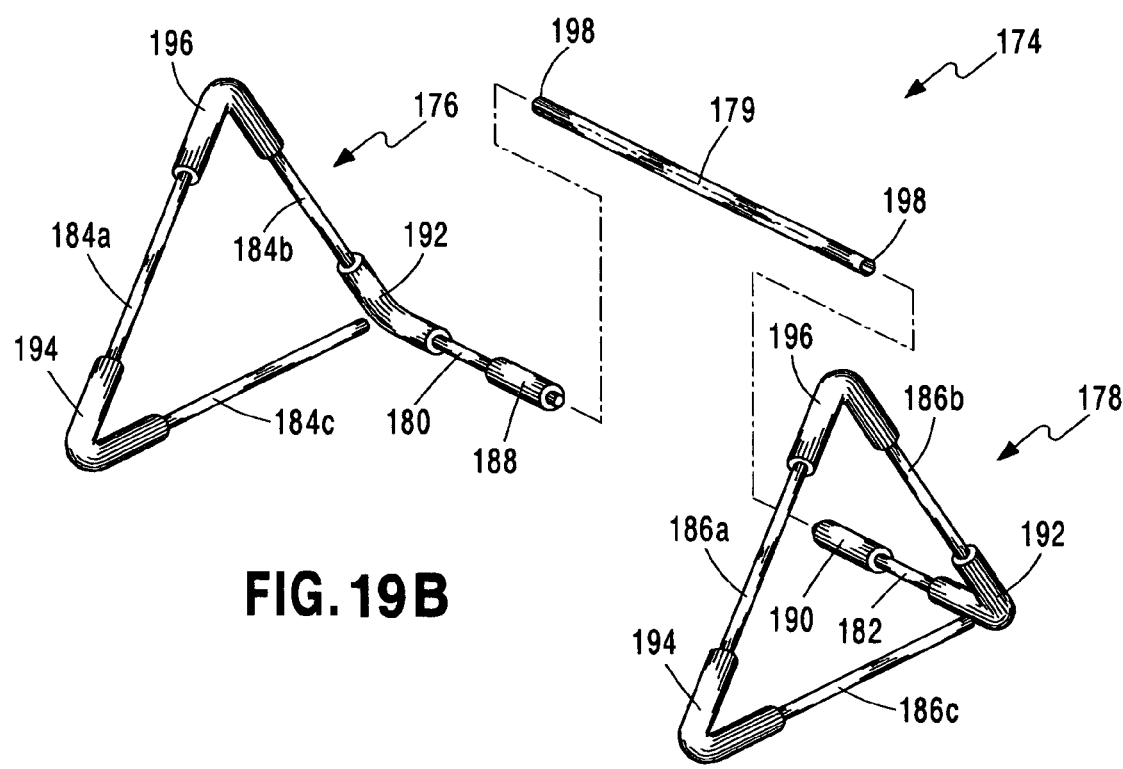
FIG. 19B is an exploded perspective view of the third embodiment of the present invention.

FIGS. 19A and 19B are perspective views of a media holding device, generally designated as 174, configured in accordance with the third preferred embodiment of the invention. In this embodiment, media holding device 174 includes left upright 176 and horizontal support shaft 180 interconnectable with right upright 178 and horizontal support shaft 182 via holding shaft extension 179.

Left upright 176 is a vertical plane defined a lower rear corner at corner sleeve 192, a lower front corner at corner sleeve 194, and an upper corner at corner sleeve 196. Left upright 176 is also created from a continuous length of rod stock formed into segments 184a, 184b, and 184c, defining a triangular shape. Horizontal support shaft 180 is also an integral portion of the rod stock formed into segments 184a, 184b, and 184c. As such, segments 184a, 184b, and 184c and horizontal support shaft 180 are formed and finished from a continuous length of rod stock to constitute the structural framework of left upright 176 and horizontal support shaft 180.

Horizontal support shaft 180 extends perpendicularly from left upright 176 at the lower rear corner at corner sleeve 192, and along with segment 184c, creates a horizontal plane define by the lower rear corner at corner sleeve 192, the lower front corner at corner sleeve 194, and end sleeve 188 on horizontal support shaft 180. This horizontal plane supports left upright 176 and resists the imposed spreading forces of media.

Similarly, right upright 178 is a vertical plane defined a lower rear corner at corner sleeve 192, a lower front corner at corner sleeve 194, and an upper corner at corner sleeve 196. Right upright 178 is also created from a continuous length of rod stock formed into segments 186a, 186b, and 186c, defining a triangular shape. Horizontal support shaft 182 is also an integral portion of the rod stock formed into segments 186a, 186b, and 186c. As such, segments 186a, 186b, and 186c and horizontal support shaft 182 are formed and finished from a continuous length of rod stock to constitute the structural framework of right upright 178 and horizontal support shaft 182.

Horizontal support shaft 182 extends perpendicularly from right upright 178 at the lower rear corner at corner sleeve 192, and along with segment 186c, creates a horizontal plane define by the lower rear corner at corner sleeve 192, the lower front corner at corner sleeve 194, and end sleeve 190 on horizontal support shaft 182. This horizontal plane supports right upright 178 and resists the imposed spreading forces of media.

End sleeves 188 and 190 are frictional surfaces secured to horizontal support shafts 180 and 182, and combine with the lower corner sleeves 192 and 194, which are also frictional surfaces, to provide both frictional and non-marring contact with all horizontal and vertical contacting surfaces. Upper corner sleeves 196, which are also frictional surfaces, provide soft cushioned contact with stored media, and absorb minute disturbances, in a manner described in FIG. 17.

Media holding device 174 is a variation in use of media holding device 120 described in FIG. 17. Horizontal support shafts 180 and 182 are asymmetrically positioned so as to extend toward one another (i.e., facing "inward"), thereby locating them behind the stored media, and connected axially by holding shaft extension 179 engaged with the ends of horizontal support shafts 180 and 182 as shown. As illustrated in FIG. 19B, holding shaft extension 179 is slid onto horizontal support shafts 180 and 182, and extends underneath end sleeves 188 and 190, thereby holding shaft extension 179 firmly in place during use. Holding shaft extension 179 accordingly provides additional support for stabilizing left upright 176 and right upright 178.

Holding shaft extension 179 maybe comprised of a sufficiently rigid hollow tube or a solid shaft with "blind" holes on both ends at areas 198, so as to provide axial engagement. Specific dimensional details depend greatly upon economical considerations, and persons skilled in the art can recognize many alternatives in construction and assembly. The location of holding shaft extension 179 when installed (i.e., behind the stored media items) minimizes obtrusive "visual" clutter that is common to many of the currently available products in this product category.

Another benefit of media holding device 174 is that a variety of holding shaft extensions 179 with alternative lengths may be incorporated to provide a means of incremental adjustment of the distance between left upright 176 and right upright 178 through an assortment of modular component parts. This illustrates the multitude of different use of the present invention. For example, left upright 176 and right upright 178 may be used individually as Bookshelf End Frames as illustrated in FIG. 17 or 18, and then re-positioned so that horizontal support shafts 180 and 182 extend towards each other. Extension shaft 179, with a desired length, then interconnects left upright 176 and right upright 178. When an adjustment in the distance between left upright 176 and right upright 178 is required, the currently interconnected holding shaft extension 179 is replaced with another holding shaft extension 179, having a different length. As such, the present invention, as described in media holding device 174, provides a modular media holding device that contains a high level of media volume flexibility and uses a minimal amount of space.

Figure 20A:
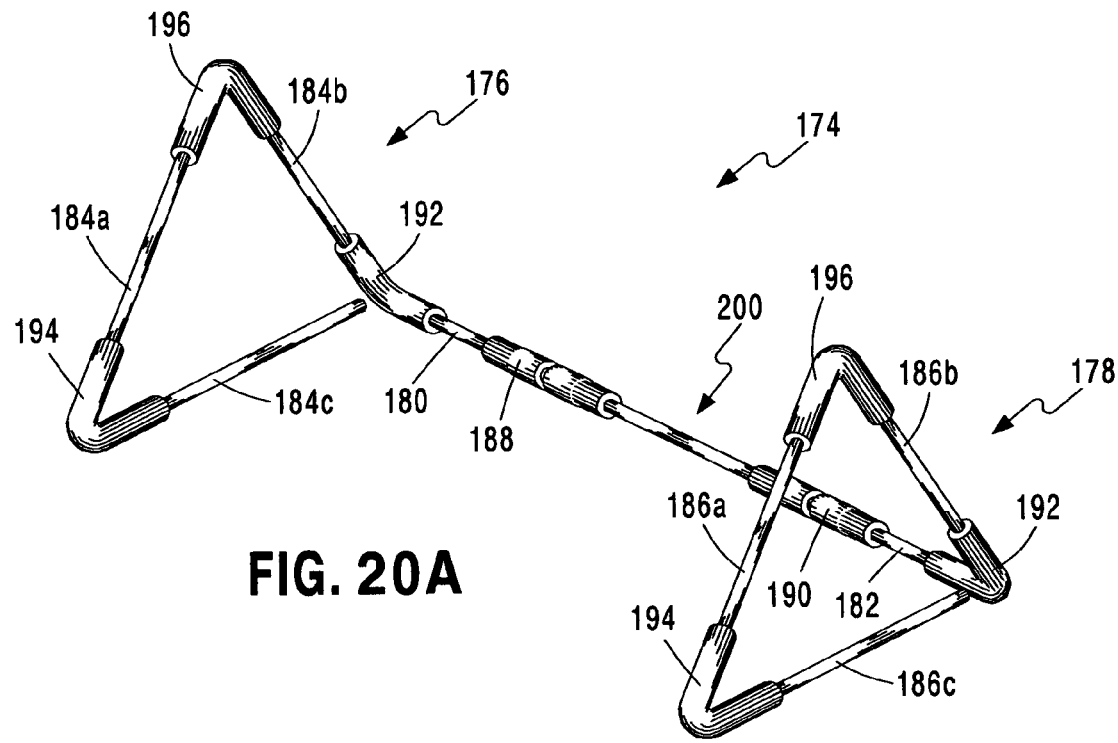
FIG. 20A is a perspective view an alternative design of the third embodiment of the present invention.
Figure 20B:
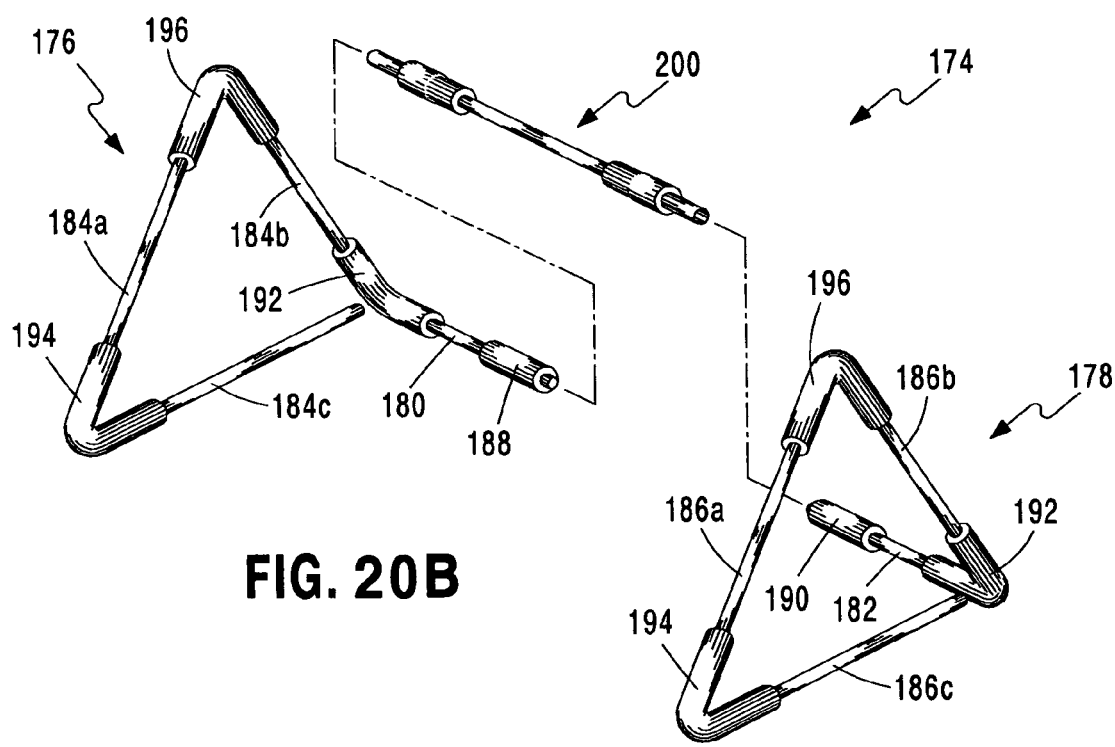
FIG. 20B is an exploded perspective view an alternative design of the third embodiment of the present invention.

FIGS. 20A–20D illustrate an alternative design of the holding shaft extension. FIGS. 20A and 20B are perspective views of the media holding device 174 as described in FIGS. 19A and 19B incorporating holding shaft extension 200 in lieu of holding shaft extension 179. Holding shaft extension 200 is interconnectable with end sleeves 188 and 190 in the same manner as holding shaft extension 179. As illustrated in FIG. 20B, holding shaft extension 200 is slid onto horizontal support shafts 180 and 182, and extends underneath end sleeves 188 and 190, thereby holding shaft extension 200 firmly in place during use.

Figure 20C:
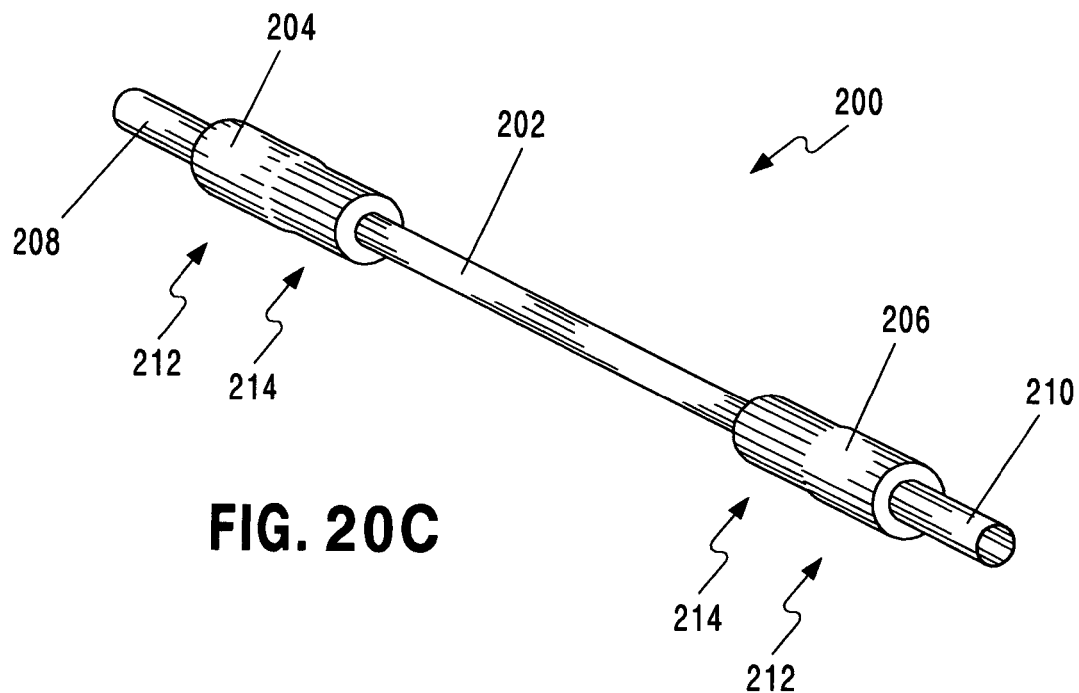
FIG. 20C is a perspective view of a holding extension shaft of the third embodiment of the present invention.
Figure 20D:
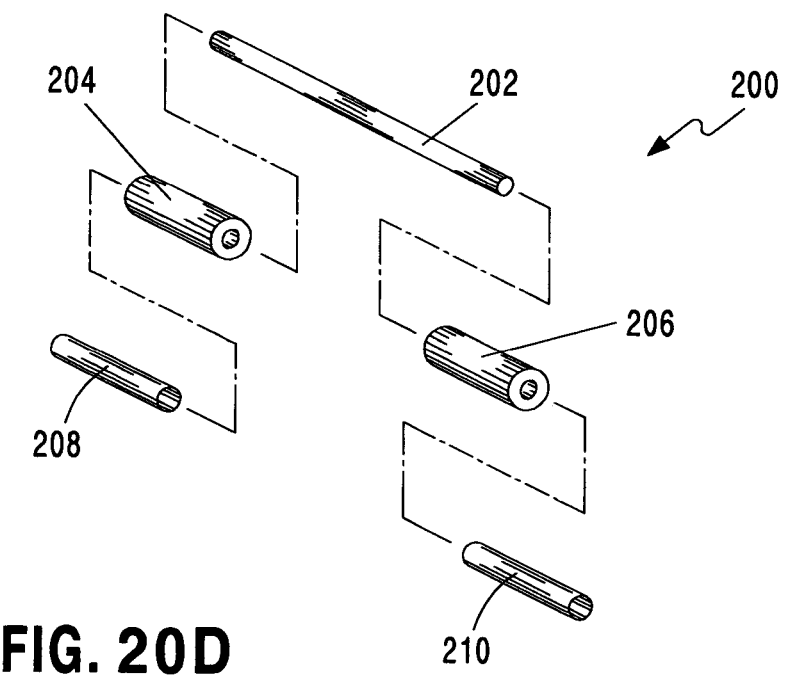
FIG. 20D is an exploded perspective view of a holding extension shaft of the third embodiment of the present invention.

As illustrated in FIGS. 20C and 20D, holding shaft extension 200 consists of a solid shaft 202 connected to rigid hollow tubes 208 and 210 via end sleeves 204 and 206. End sleeves 204 and 206 are identical to end sleeves 188 and 190. FIG. 20C further illustrates in detail the expansion of end sleeves 204 and 206 when the components of holding shaft extension 200 are connected. Due to the greater diameter of rigid hollow tubes 208 and 210, the portions of end sleeves 204 and 206 at points 212 are expanded when rigid hollow tubes 208 and 210 are inserted, as opposed to the narrower diameters at points 214.

A distinct advantage of holding shaft extension 200 over holding shaft extension 179 is the reduced material cost. The components of holding shaft extension 200 are significantly less expensive than holding shaft extension 179 (a rigid hollow tube or solid shaft with manufactured blind holes). Rigid hollow tubes are generally much more expensive than solid shafts. As such, by minimizing the length of rigid hollow tubing to that of rigid hollow tubes 208 and 210, holding shaft extension 200 provides for a greater economic advantage, while retaining the structural and functional benefits of holding shaft extension 179.

Figure 21A:
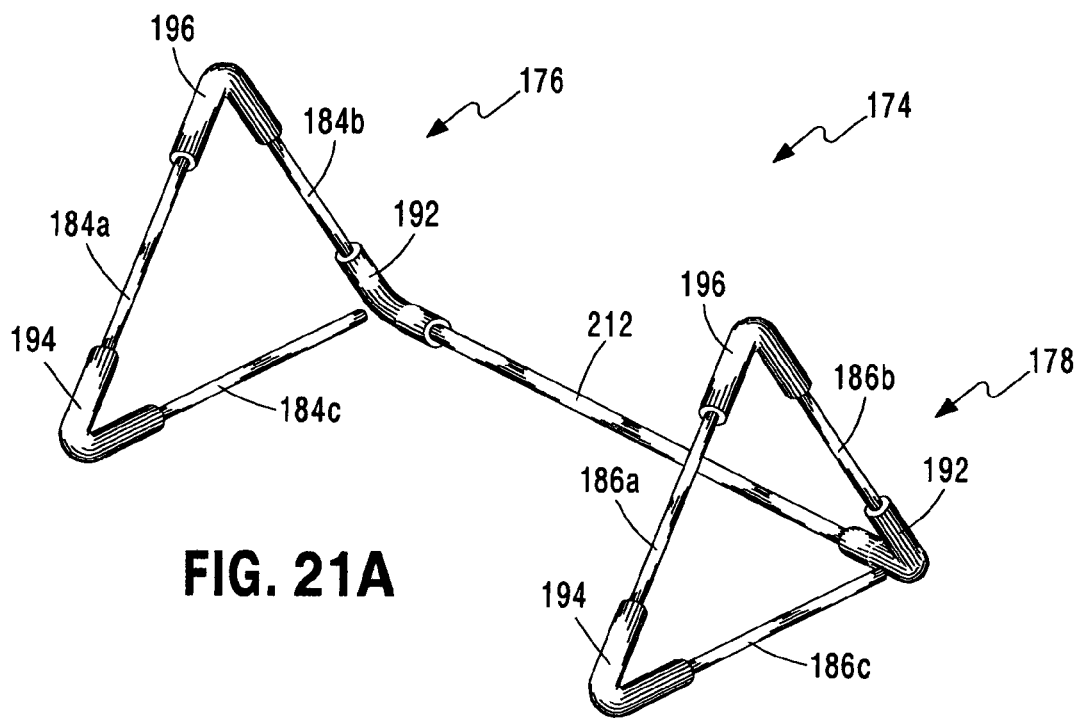
FIG. 21A is a perspective view an alternative design of the third embodiment of the present invention.
Figure 21B:
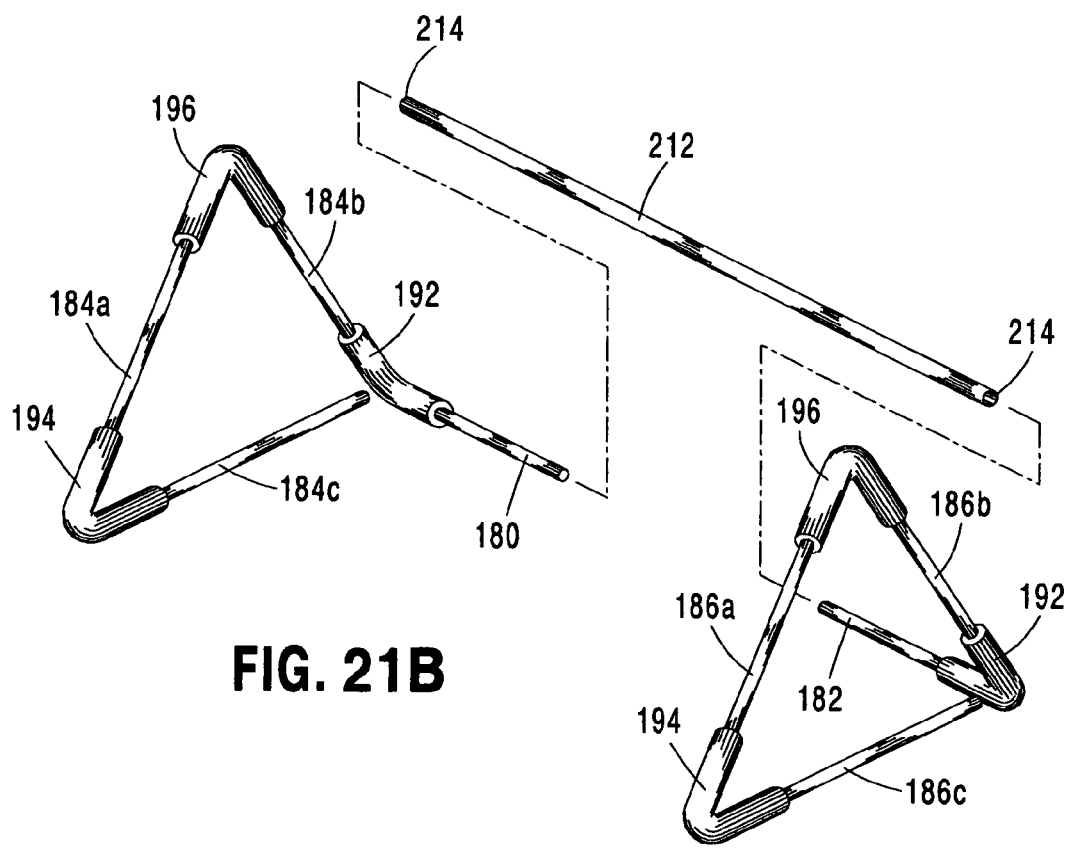
FIG. 21B is an exploded perspective view an alternative design of the third embodiment of the present invention.

FIGS. 21A and 21B are perspective views illustrating another alternative design of the extension shaft and include media holding device 174, as described in FIGS. 19A and 19B, incorporating holding shaft extension 212 in lieu of holding shaft extension 179. Additionally, end sleeves 188 and 190 are removed from horizontal support shafts 180 and 182, respectively. This process can be performed easily by hand and without tools.

As with holding shaft extension 179, holding shaft extension 212 may be comprised of a sufficiently rigid hollow tube or a solid shaft with "blind" holes on both ends at areas 214, so as to provide axial engagement. Holding shaft extension 212 is interconnectable with corner sleeves 192, as illustrated in FIGS. 21A and 21B. Holding shaft extension 212 is slid onto horizontal support shafts 180 and 182, and extends underneath corner sleeves 192, thereby holding shaft extension 212 firmly in place during use.

This engagement means provides several unique advantages. First, engagement of the holding shaft extension 212 along the full available length of each of horizontal support shafts 180 and 182 (i.e., "full" engagement) provides a very strong and reliable shaft connection suitable for the heaviest of media items such as large books. Second, such engagement minimizes any looseness in the connection, keeping the connection very "tight" as holding shaft extension 212 engages horizontal support shafts 180 and 182 as they begin their curvature at corner sleeves 192. Third, a tubular extension, when loosened from one of corner sleeves 192, offers an "adjustable" extension, to the extent provided by the geometries of the assembled parts. If horizontal support shaft 180 or 182 is lengthened, for example, the distance between left upright 176 and right upright 178 is adjustably increased to the extent provided by the length of such horizontal support shaft and the length of holding shaft extension 212. Such engagement would be of a telescoping nature, providing a range of slidable adjustment of left upright 176 and right upright 178 with respect to one another.

As with holding shaft extension 179, alternative lengths of holding shaft extension 212 provide a means of incrementally fixed-length adjustment or a means of continuously sliding adjustment of left upright 176 and right upright 178, through a choice of optional part geometries and assembly configuration.

FIGS. 22A and 22B are perspective views of a media holding device, generally designated as 216, configured in accordance with the fourth preferred embodiment of the invention. In this embodiment, media holding device 216 includes left upright 218, right upright 220, horizontal support shafts 222 and 224, and retainers 226 and 228. Horizontal support shaft 222 is an integral portion of formed rod segments 230a, 230b, and 230c, formed from a continuous length of rod stock formed and finished to constitute the structural framework of left upright 218. Likewise, horizontal support shaft 224 is an integral portion of formed rod segments 232a, 232b, and 232c, formed from a continuous length of rod stock formed and finished to constitute the structural framework of right upright 220.

Left upright 218 is a vertical plane defined by a lower rear corner at corner sleeve 234, a lower front corner at corner sleeve 236, and an upper corner at corner sleeve 238. Left upright 218 is also created from a continuous length of rod stock formed into segments 230a, 230b, and 230c, defining a triangular shape. Horizontal support shaft 222 is also an integral portion of the rod stock formed into segments 230a, 230b, and 230c. As such, segments 230a, 230b, and 230c and horizontal support shaft 222 are formed and finished from a continuous length of rod stock to constitute the structural framework of left upright 218 and horizontal support shaft 222.

Right upright 220 is also a vertical plane defined by a lower rear corner at corner sleeve 234, a lower front corner at corner sleeve 236, and an upper corner at corner sleeve 238. Right upright 220 is also created from a continuous length of rod stock formed into segments 232a, 232b, and 232c, defining a triangular shape. Horizontal support shaft 224 is also an integral portion of the rod stock formed into segments 232a, 232b, and 232c. As such, segments 232a, 232b, and 232c and horizontal support shaft 224 are formed and finished from a continuous length of rod stock to constitute the structural framework of right upright 220 and horizontal support shaft 224.

Lower corner sleeves 234 and 236 are frictional surfaces that provide both frictional and non-marring contact with all horizontal and vertical contacting surfaces. Upper corner sleeves 238 are frictional surfaces that provide soft cushioned contact with stored media, and absorb minute disturbances.

In this embodiment, horizontal support shafts 222 and 224 are asymmetrically positioned so as to extend toward one another (i.e., facing "inward"), thereby locating them behind stored media 240, and bound together (i.e., alongside in direct contact with one another) with added retainers 226 and 228, generally as shown. Retainers 226 and 228 are used in place of smaller end sleeves 188 and 190 (illustrated in FIGS. 19A–19B and 20A–20B), which are removed from horizontal support shafts 222 and 224. Again, this process can be performed easily by hand and without tools.

FIG. 22B illustrates an exploded view of media holding device 216. Alternative lengths of horizontal support shafts 222 and 224 provide alternative storage capacity of media retained between the left upright 218 and right upright 220. Retainers 226 and 228 are inserted onto horizontal support shafts 222 and 224, respectively. Horizontal support shafts 222 and 224 are then inserted into the reciprocal retainers 226 and 228, allowing retainers 226 and 228 to securely retain horizontal support shafts 222 and 224. The relatively small storage capacity in this configuration make it ideal for close-proximity desktop purposes, such as keeping a few critical reference books close-at-hand and separated from larger bookshelf arrays. Many alternative formed shapes and sizes are, of course, optional in any of the configurations described.

FIG. 23 is a perspective view of media holding device 216 as described in FIGS. 22A and 22B, incorporating the use of holding shaft extension 242. Horizontal support shafts 222 and 224 are asymmetrically positioned so as to extend toward one another (i.e., facing "inward"), thereby locating them behind the stored media, and bound to holding shaft extension 242 with added retainers 226, 228, 244, and 246, generally as shown.

Holding shaft extension 242 may be a rigid hollow tube similar to holding shaft extension 212, or may be a solid rod shaft for reducing material costs. Retainers 226 and 244 are inserted onto horizontal support shaft 222, and retainers 246 and 228 are inserted onto horizontal support shaft 224, respectively. Holding shaft extension 242 is then inserted through retainers 226, 228, 244, and 246, and is attached in parallel contact with inwardly facing horizontal support shafts 222 and 224. This provides a fixed distance between the uprights, resulting from the length of the added extension shaft.

Media holding device 216, as described in FIGS. 22A, 22B, and 23 provides additional modular designs for holding media containing a high level of media volume flexibility and uses a minimal amount of space.

The present invention, as disclosed in the embodiments above, provides a media holding device capable of combining the need for effective and efficient media storage and display. The present invention incorporates an aesthetically pleasing organizational appearance and attractiveness that provides appealing visibility and immediate accessibility of stored media, while also minimizing space usage and material and manufacturing costs. Although the present invention has been described with reference to preferred embodiments, workers skilled in the art will recognize that changes may be made in form and detail without departing from the spirit and scope of the invention.

The invention claimed is:

1. A media holding device comprising:
   a first vertical element formed from a first rod, and forming a first vertical plane defined by a plurality of corner portions, wherein the first vertical element at least partially defines a media holding region for receiving media; and
   a first horizontal extension element formed from a portion of the first rod, and extending from a lower rear corner of the first vertical element perpendicularly to the first vertical plane to define a first horizontal plane for supporting the first vertical element, wherein the media holding region is located forward of the first horizontal extension element, and no other horizontal element is connected to the first vertical element and extends into the media holding region, so that the media holding region is free of any horizontal element, including the first horizontal extension element.

2. The media holding device of claim 1, wherein the first vertical element is triangular.

3. The media holding device of claim 2, further comprising a first frictional surface secured to the first vertical element, and a second frictional surface secured to the first horizontal extension element.

4. The media holding device of claim 1 further comprising:
   a second vertical element formed from a second rod, and forming a second vertical plane defined by at least three corner portions, wherein the second vertical element at least partially defines the media holding region; and
   a second horizontal extension element formed from a portion of the second rod, and extending from a lower rear corner of the second vertical element perpendicularly to the second vertical plane to define a second horizontal plane for supporting the second vertical element, wherein the media holding region is located forward of the second horizontal extension element, and no other horizontal element is connected to the second vertical element and extends into the media holding region, so that the media holding region is free of any horizontal element, including the second horizontal extension element.

5. The media holding device of claim 4, wherein the first horizontal extension element and the second horizontal extension element are slidably connected such that the first horizontal extension element and the second horizontal extension element are capable of sliding in both a converging motion and a diverging motion for adjusting a distance between the first vertical element and the second vertical element.

6. The media holding device of claim 5 further comprising:
   a first end stop secured to the first horizontal extension element and slidably connected to the second horizontal extension element; and a second end stop secured to the second horizontal extension element and slidably connected to the first horizontal extension element;

wherein the first end stop and the second end stop provide a minimum limit and a maximum limit for adjusting the distance between the first vertical element and the second vertical element.

7. The media holding device of claim 6, wherein the first end stop comprises a first guide bushing and wherein the second end stop comprises a second guide bushing, wherein the first guide bushing and the second guide bushing are adapted to guide the first horizontal extension element and the second horizontal extension element in the converging motion and in the diverging motion.

8. The media holding device of claim 6, wherein the first end stop and the second end stop each comprise an oblique hole passageway.

9. The media holding device of claim 6 wherein the first end stop and the second end stop each comprise frictional means for providing guided frictional resistance to the first horizontal extension element and the second horizontal extension element when adjusting the distance between the first vertical element and the second vertical element.

10. The media holding device of claim 4, wherein the first vertical element and the second vertical element are each triangular.

11. The media holding device of claim 10, further comprising a first frictional surface secured to the first vertical element, a second frictional surface secured to the first horizontal extension element, a third frictional surface secured to the second vertical element, and a fourth frictional surface secured to the second horizontal extension element.

12. The media holding device of claim 11, wherein the first horizontal extension element and the second horizontal extension element are slidably connected such that the first horizontal extension element and the second horizontal extension element are capable of sliding in both a converging motion and a diverging motion for adjusting a distance between the first vertical element and the second vertical element.

13. The media holding device of claim 12 further comprising:

a first end stop secured to the first horizontal extension element and slidably connected to the second horizontal extension element; and a second end stop secured to the second horizontal extension element and slidably connected to the first horizontal extension element;

wherein the first end stop and the second end stop provide a minimum limit and a maximum limit for adjusting the distance between the first vertical element and the second vertical element.

14. The media holding device of claim 13, wherein the first end stop comprises a first guide bushing and wherein the second end stop comprises a second guide bushing, wherein the first guide bushing and the second guide bushing are adapted to guide the first horizontal extension element and the second horizontal extension element in the converging motion and in the diverging motion.

15. The media holding device of claim 13, wherein the first end stop and the second end stop each comprise an oblique hole passageway.

16. The media holding device of claim 13 wherein the first end stop and the second end stop each comprise frictional means for providing guided frictional resistance to the first horizontal extension element and the second horizontal extension element when adjusting the distance between the first vertical element and the second vertical element.

17. The media holding device of claim 4, wherein the first horizontal extension element and the second horizontal extension element are securely connected, wherein the first vertical element and the second vertical element are separated by a distance determined in part by a combination of a length of the first horizontal extension element and a length of the second horizontal extension element.

18. The media holding device of claim 17 further comprising a sleeve for securely connecting the first horizontal extension element and second horizontal extension element.

19. The media holding device of claim 18, further comprising a first frictional surface secured to the first vertical element and a second frictional surface secured to the second vertical element.

20. The media holding device of claim 4, wherein the first horizontal extension element and the second horizontal extension element are removably engagable, wherein when the first horizontal extension element and the second horizontal extension element are engaged, the first vertical element and the second vertical element are separated by a distance determined in part by a combination of a length of the first horizontal extension element and a length of the second horizontal extension element.

21. The media holding device of claim 20 further comprising a sleeve adapted to allow the first horizontal extension element to removably engage with the second horizontal extension element.

22. The media holding device of claim 21, further comprising a first frictional surface secured to the first vertical element and a second frictional surface secured to the second vertical element.

23. The media holding device of claim 4 further comprising a removable extension rod adapted to engage with the first horizontal extension element and the second horizontal extension element, for providing a connection between the first vertical element and the second vertical element, wherein when the removable extension rod is engaged with the first horizontal extension element and the second horizontal extension element, the first vertical element and the second vertical element are separated by a distance determined in part by a combination of a length of the removable extension rod, a length of the first horizontal extension element, and a length of the second horizontal extension element.

24. The media holding device of claim 23 further comprising:

a first sleeve engageable with the removable extension rod and the first horizontal extension element, and adapted to allow the removable extension rod to removably engage with the first horizontal extension element; and a second sleeve engageable with the removable extension rod and the second horizontal extension element, and adapted to allow the removable extension rod to removably engage with the second horizontal extension element.

25. The media holding device of claim 24, further comprising a first frictional surface secured to the first vertical element and a second frictional surface secured to the second vertical element.

26. The media holding device of claim 4 further comprising a plurality of interchangeable, removable extension rods, wherein each of the plurality is adapted to engage with the first horizontal extension element and the second horizontal extension element to provide a connection between the first vertical element and the second vertical element, and wherein when one of the plurality is engaged with the first horizontal extension element and the second horizontal extension element, the first vertical element and the second vertical element are separated by a distance determined in part by a combination of a length of the one of the plurality, a length of the first horizontal extension element, and a length of the second horizontal extension element.

27. The media holding device of claim 26 further comprising:
  a first sleeve engageable with each of the plurality and the first horizontal extension element, for allowing each of the plurality to removably engage with the first horizontal extension element; and
  a second sleeve engageable with each of the plurality and the second horizontal extension element, for allowing each of the plurality to removably engage with the second horizontal extension element.

28. The media holding device of claim 27, further comprising a first frictional surface secured to the first vertical element and a second frictional surface secured to the second vertical element.

29. A media holding device comprising:
  a first upright;
  a second upright parallel to the first upright;
  a horizontal support connected to a lower rear corner portion of the first upright and a lower rear corner portion of the second upright for providing rear-leveraged retention, wherein the first upright and the second upright are separated by a distance determined in part by a length of the horizontal support; and
  a media holding region defined by the first and second uprights and the horizontal support, wherein the media holding region extends laterally between the first and second uprights and forward from the horizontal support, so that the horizontal support is positioned behind the media holding region and the media holding region is free of any horizontal element forward of the horizontal support that is connected to the first and second uprights.

30. The media holding device of claim 29, further comprising a first frictional surface secured to the first upright and a second frictional surface secured to the second upright.

31. The media holding device of claim 29, wherein the length of the horizontal support is adjustable for adjusting the distance between the first upright and the second upright.

32. The media holding device of claim 31, wherein the horizontal support comprises:
  a first shaft, wherein the first shaft is a first portion of the horizontal support that is connected to the first corner portion of the first upright; and
  a second shaft, wherein the second shaft is a second portion of the horizontal support that is connected to the second corner portion of the second upright;
  wherein the first shaft and the second shaft are slidably connected for allowing the horizontal shaft to be adjustable.

33. The media holding device of claim 31, further comprising a first frictional surface secured to the first upright and a second frictional surface secured to the second upright.

34. The media holding device of claim 31 further comprising frictional means for providing guided frictional resistance to the horizontal support when adjusting the distance between the first upright and the second upright.

35. The media holding device of claim 29, wherein the horizontal support is selectable from a plurality of interchangeable shafts, wherein each of the plurality is removably connectable with the first upright and the second upright, and wherein the length of the horizontal support is determined in part by a length of one of the plurality connected with the first upright and the second upright.

36. The media holding device of claim 35, further comprising a first frictional surface secured to the first upright and a second frictional surface secured to the second upright.

37. A media holding device comprising:
  a first upright;
  a second upright, wherein the first upright and the second upright are separated by a distance;
  a first horizontal support shaft extending from a lower rear corner portion of the first upright;
  a second horizontal support shaft extending from a lower rear corner portion of the second upright; and
  a media holding region defined as being between the first and second uprights and forward of the first and second horizontal support shafts, so that the first and second horizontal support shafts are positioned behind the media holding region and the media holding region is free of any horizontal element forward of the first and second horizontal support shafts and extending from the first and second uprights;
  wherein the first horizontal support shaft and the second horizontal support shaft are slidably connected such that the first horizontal support shaft and the second horizontal support shaft are capable of sliding in both a converging motion and a diverging motion, for adjusting the distance between the first upright and the second upright.

38. The media holding device of claim 37 further comprising:
  a first end stop secured to the first horizontal support shaft and slidably connected to the second horizontal support shaft; and
  a second end stop secured to the second horizontal support shaft and slidably connected to the first horizontal support shaft;
  wherein the first end stop and the second end stop provide a minimum limit and a maximum limit for adjusting the distance between the first upright and the second upright.

39. The media holding device of claim 38, wherein the first end stop comprises a first guide bushing and wherein the second end stop comprises a second guide bushing, wherein the first guide bushing and the second guide bushing are adapted to guide the first horizontal support shaft and the second horizontal support shaft in the converging motion and in the diverging motion.

40. The media holding device of claim 38, wherein the first end stop and the second end stop each comprise an oblique hole passageway.

41. The media holding device of claim 38, wherein the first end stop and the second end stop each comprise frictional means for providing guided frictional resistance to the first horizontal support shaft and the second horizontal support shaft in the converging motion and in the diverging motion.

42. The media holding device of claim 38, further comprising a first frictional surface secured to the first upright and a second frictional surface secured to the second upright.

43. The media holding device of claim 37, wherein the first upright and the first horizontal support shaft are formed from a first single formed rod, and wherein the second upright and the second horizontal support shaft are formed from a second single formed rod.

44. The media holding device of claim 43 further comprising:
- a first end stop secured to the first horizontal support shaft and slidably connected to the second horizontal support shaft; and
- a second end stop secured to the second horizontal support shaft and slidably connected to the first horizontal support shaft;
- wherein the first end stop and the second end stop provide a minimum limit and a maximum limit for adjusting the distance between the first upright and the second upright.

45. The media holding device of claim 44, wherein the first end stop comprises a first guide bushing and wherein the second end stop comprises a second guide bushing, wherein the first guide bushing and the second guide bushing are adapted to guide the first horizontal support shaft and the second horizontal support shaft in the converging motion and in the diverging motion.

46. The media holding device of claim 44, wherein the first end stop and the second end stop each comprise an oblique hole passageway.

47. The media holding device of claim 44, wherein the first end stop and the second end stop each comprise frictional means for providing guided frictional resistance to the first horizontal support shaft and the second horizontal support shaft in the converging motion and in the diverging motion.

48. The media holding device of claim 44, further comprising a first frictional surface secured to the first upright and a second frictional surface secured to the second upright.

* * * * *